(12) United States Patent
Roh et al.

(10) Patent No.: US 7,327,714 B2
(45) Date of Patent: Feb. 5, 2008

(54) APPARATUS AND METHOD FOR DETECTING A TIME DIVISION MULTIPLEXING FRAME IN A MOBILE COMMUNICATION SYSTEM

(75) Inventors: Hee-Jin Roh, Suwon-si (KR); Min-Goo Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 176 days.

(21) Appl. No.: 11/142,353

(22) Filed: Jun. 2, 2005

(65) Prior Publication Data

US 2005/0286459 A1    Dec. 29, 2005

(30) Foreign Application Priority Data

Jun. 2, 2004 (KR) ............... 10-2004-0040140
Jun. 3, 2004 (KR) ............... 10-2004-0040554

(51) Int. Cl.
*H04B 7/212* (2006.01)

(52) U.S. Cl. ............... 370/347; 455/522; 375/262

(58) Field of Classification Search ............ 370/347, 370/500, 335; 455/522; 375/253, 262
See application file for complete search history.

(56) References Cited

U.S. PATENT DOCUMENTS 5,968,201 A * 10/1999 Shida et al. ............ 714/795
6,141,388 A * 10/2000 Servais et al. ........... 375/262
6,763,244 B2 * 7/2004 Chen et al. ............. 455/522
7,020,209 B1 * 3/2006 Okumura .............. 375/253
2005/0138531 A1 * 6/2005 Kim ..................... 714/774
2005/0254463 A1 * 11/2005 Suzuki et al. ........... 370/335
2005/0281290 A1 * 12/2005 Khandekar et al. ...... 370/500

FOREIGN PATENT DOCUMENTS

| JP | 02-241249 | 9/1990 |
| JP | 05-207076 | 8/1993 |
| JP | 09-172428 | 6/1997 |
| JP | 10-070472 | 3/1998 |
| JP | 2001-292128 | 10/2001 |
| WO | WO 01/01610 | 1/2001 |

* cited by examiner

*Primary Examiner*—Sanh D. Phu
(74) *Attorney, Agent, or Firm*—Roylance, Abrams, Berdo & Goodman L.L.P.

(57) ABSTRACT

An apparatus and a method are provided for improving reception reliability for control channels by detecting time division multiple (TDM) frames transmitted through the control channels in a TDM mobile communication system. The apparatus and method include receiving the frame through the forward control channel and performing a cyclic redundancy checking (CRC) with respect to the frame, thereby outputting a first error detection bit, measuring reception power for the frame, calculating a first path metric when decoding a channel of the frame, estimating a second path metric by using the first path metric and the reception power, and outputting a second error detection bit by comparing the second path metric with a predetermined threshold value, and creating and outputting a frame quality bit for detecting validity of the frame based on the first and second error detection bits.

34 Claims, 15 Drawing Sheets

APPARATUS AND METHOD FOR DETECTING A TIME DIVISION MULTIPLEXING FRAME IN A MOBILE COMMUNICATION SYSTEM

PRIORITY

This application claims the benefit under 35 U.S.C. 119(a) of applications entitled "Apparatus And Method For Detecting Time Division Multiplexing Frame In Mobile Communication System" filed in the Korean Intellectual Property Office on Jun. 2, 2004 & Jun. 3, 2004 and assigned Serial Nos. 2004-40140 & 2004-40554, the entire contents of which are incorporated herein by reference.

BACKGROUND OF THE INVENTION

1. Field of the Invention

The present invention relates to an apparatus and a method for receiving control channels in a mobile communication system providing packet data services. More particularly, the present invention relates to an apparatus and a method for improving reception reliability for control channels by detecting time division multiple (TDM) frames transmitted through the control channels in a TDM mobile communication system.

2. Description of the Related Art

Mobile communication systems are now providing users with data communication services in addition to voice communication services. Such mobile communication systems can provide not only various data services, but also various broadcast services. To support the broadcast services, broadcast data are transmitted using a time division multiple (TDM) scheme in a frame unit. If the broadcast data are transmitted through the TDM scheme, receivers can selectively receive a minimum amount of frames so that the reception efficiency of the data can be improved.

Various standardizations have been prepared in the 3GPP2 group to provide the broadcast services by using a code division multiple access (CDMA) scheme. According to the CDMA 2000 1×Rev. D standardization, which has been suggested by the 3GPP2 group, the broadcast service is called a "broadcast multicast service". The CDMA 2000 1×Rev. D standardization defines the size of physical channels used in a 1×EV-DV (Evolution for Data & Voice) system capable of simultaneously providing packet services and voice services. Hereinafter, the description will be made in relation to a forward dedicated channel (F-DCCH) of the physical channels, which is a control channel for providing users with control information in a Broadcast and Multicast Service (BCMCS) service.

According to the BCMCS service, as opposed to a unicast scheme, broadcast data or push to talk (PTT) service data are transmitted to a plurality of users through one physical channel. The control information is transmitted to the users through the F-DCCH in a forward link of the 1×EV-DV system providing the BCMCS service. In addition, the users may share the same physical channel through the TDM scheme and the users are differentiated from each other by means of a long code mask.

FIG. 1 is a block diagram illustrating the structure of a transmitter 100 and a receiver 200 in a conventional mobile communication system. Hereinafter, the standardization for a baseband physical channel of a F-DCCH used as a control channel in the 1×EV-DV system and the structure of the receiver 200 will be described with reference to FIG. 1.

Referring to FIG. 1, a cyclic redundancy checking (CRC) inserter 110 inserts CRC bits into information bits in order to check for errors in the information bits transmitted to specific users as control information and sends the information bits with the CRC bits to a channel coder 120. The channel coder 120 codes the information bits having the CRC bits through a predetermined channel coding scheme and sends the channel-coded information bits to a scrambler 130. The channel coding scheme may include a convolutional coding scheme.

The scrambler 130 performs long code mask scrambling with respect to channel-coded information bits to provide security to the channel-coded information bits per each user. Then, the scrambler 130 sends the channel-coded information bits to a spreader 140. Upon receiving the channel-coded information bits, the spreader 140 spreads the channel-coded information bits by using PN codes and Walsh codes and sends them to a radio network. Thus, the spread information bits in the form of frame units are transmitted to the receiver 200 through the F-DCCH.

As the spread information bits have been received in the receiver 200, a despreader 210 of the receiver 200 despreads the information bits of the frames by using the PN codes and Walsh codes and sends them to a descrambler 220. Thus, the descrambler 220 descrambles the despread information bits by using the long code mask and send them to a channel decoder 230. Upon receiving the descrambled information bits, the channel decoder 230 decodes the descrambled information bits and sends the decoded information bits to a CRC inspector 240. If a convolution coder is used as the channel coder 120, a Viterbi decoder is used as the channel decoder 230.

The CRC inspector 240 checks for a transmission error in the frame by using the CRC bits contained in the decoded bits and outputs error detection bits for determining the validity of the frame, that is, decoded bits.

According to the 1×EV-DV system, the users may share the same F-DCCH channel, through which information bits in the form of frame units are transmitted as control information for supporting the broadcast service, by means of the TDM scheme. In addition, the users may be differentiated from each other by using the long code mask.

FIG. 2 is a schematic diagram illustrating the structure of a control channel through which control information is transmitted using the TDM scheme in the conventional mobile communication system. The control channel shown in FIG. 2 is the F-DCCH and control information transmitted to users (user 1, user 2, user 3, etc) is time-multiplexed in a frame unit ($T_F$). In addition, the control information, that is, the information bits are coded by using the long code mask allocated to each user, thereby differentiating the control information transmitted to each user.

The receiver 200 shown in FIG. 1 descrambles the coded information bits by using the long code allocated to each mobile station. At this time, if the descrambled information bits belong to the TDM frame allocated to the receiver 200, the CRC inspector 240 of the receiver 200 outputs an error detection bit "Good" based on the characteristic of a code word. However, if the descrambled information bits belong to the TDM frame allocated to the other receiver, the CRC inspector 240 of the receiver 200 outputs an error detection bit "Bad" due to the discord of the long code. In addition, the CRC inspector 240 of the receiver 200 outputs the error detection bit "Bad" when the reception quality of the frame is lowered so that the receiver 200 may detect whether the reception frame is adaptable for the receiver 200.

In this manner, each user can check whether the frame received through the control channel, that is, the F-DCCH is adaptable for the user by using the long code and the CRC. However, if the users of the frame are differentiated from each other through the above manner, it is difficult to ensure the reception reliability of the control channel.

That is, when the frame having a length of 20 ms is transmitted through the F-DCCH according to the CDMA 2000 1×Rev. D standardization, a 12-bit CRC is used to detect the frame error. In this case, the frames transmitted to other users may not match with the code word because scrambling and descrambling processes for the frames are performed based on mutually different long codes after the frames have been descrambled in the receiver 200, so that the frames represent abnormal characteristics as if they have no control signals. Accordingly, if reception signals for the frames allocated to other users or the frames having no control information are output from the channel decoder 230 in the form of a predetermined sequence, a false alarm probability (FAR) of the CRC is about $2.44 \times 10^{-4}$, which means that the detection error periodically occurs in every 82 seconds.

Therefore, if the service is provided for a long period of time, such as the broadcast service or the PTT service, the FAR of the CRC is very high. In addition, since the F-DCCH transmits an L3 signaling signal (that is, the control information), it is necessary to ensure superior reception reliability with respect to the transmission signal of the F-DCCH in order to stably provide the users with broadcast services.

Therefore, a need exists for an apparatus and method for reducing the amount of errors in a broadcast service.

SUMMARY OF THE INVENTION

Accordingly, the present invention has been made to solve the above-mentioned problems occurring in the prior art, and an object of the present invention is to provide an apparatus and a method for improving reception reliability for control channels by easily detecting time division multiple (TDM) frames, which are allocated to each user and transmitted through the control channels of a TDM mobile communication system where the users share the control channels.

To accomplish this object, according to one aspect of the present invention, there is provided a method for detecting a time division multiplexing (TDM) frame transmitted through a forward control channel, the method comprising the steps of: receiving the frame through the forward control channel and performing a cyclic redundancy checking (CRC) with respect to the frame, thereby outputting a first error detection bit; measuring reception power for the frame; calculating a first path metric when decoding a channel of the frame, estimating a second path metric by using the first path metric and the reception power, and outputting a second error detection bit by comparing the second path metric with a predetermined threshold value; and creating and outputting a frame quality bit for detecting a validity of the frame based on the first and second error detection bits.

According to another aspect of the present invention, there is provided an apparatus for detecting a time division multiplexing (TDM) frame transmitted through a forward control channel. The apparatus comprising a channel decoder for receiving the frame in order to decode a channel of the frame and to calculate and output a first path metric when decoding the channel of the frame; a cyclic redundancy checking (CRC) inspector for outputting a first error detection bit by performing a CRC inspection with respect to decoded bits output from the channel decoder; a reception power measurement unit for measuring reception power for the frame; and a frame quality bit generating unit for estimating a second path metric by using the first path metric and the reception power, outputting a second error detection bit by comparing the second path metric with a predetermined threshold value, and creating and outputting a frame quality bit for detecting a validity of the frame based on the first and second error detection bits.

According to still another aspect of the present invention, there is provided a method for detecting a time division multiplexing (TDM) frame transmitted through a forward control channel. The method comprising the steps of depuncturing control channel information by using an allocated long code mask value, thereby separately outputting data and a power control bit; performing channel-decoding and cyclic redundancy checking (CRC) inspection with respect to the data, thereby outputting decoded data; calculating a metric by using the data and power control bit; and comparing the calculated metric with a predetermined threshold value and generating frame quality bits based on results of comparison and the CRC inspection.

According to still yet another aspect of the present invention, there is provided an apparatus for detecting a time division multiplexing (TDM) frame transmitted through a forward control channel. The apparatus comprising a depuncturing unit for depuncturing control channel information by using a long code mask value allocated thereto in order to separately output data and a power control bit; a channel decoder for performing channel-decoding and cyclic redundancy checking (CRC) inspection with respect to the data in order to output decoded data; a metric calculator for calculating a metric by using the data and power control bit; a comparator for comparing an output of the metric calculator with a predetermined threshold value and outputting a result thereof; and a frame quality bit generator for generating frame quality bits based on an output of the comparator and a result of the CRC inspection.

BRIEF DESCRIPTION OF THE DRAWINGS

The above and other objects, features and advantages of the present invention will be more apparent from the following detailed description taken in conjunction with the accompanying drawings, in which.

Throughout the drawings, the same or similar elements are denoted by the same reference numerals.

DETAILED DESCRIPTION OF EXEMPLARY EMBODIMENTS

Hereinafter, embodiments of the present invention will be described with reference to the accompanying drawings. In the following detailed description, a detailed description of known functions and configurations incorporated herein will be omitted for conciseness.

First Embodiment

According to the first embodiment of the present invention, when detecting a transmission error of a TDM frame comprising information bits for each user, a second path metric is estimated by taking a first path metric and reception power for the TDM frame into consideration. The second path metric is compared with a predetermined threshold value of the path metric in order to determine a validity of a reception frame.

In addition, according to the first embodiment of the present invention, a first error detection bit is obtained based on the CRC result of a channel-decoded reception frame and a second error detection bit is obtained based on the validity of the reception frame, which is determined by using the second path metric. If both first and second error detection bits are available, it is determined that the frame is normally received through the control channel.

Prior to explaining the first embodiment of the present invention, a method of detecting the reception error of the frame by using reception power for the frame and a method of detecting the reception error of the frame by using the path metric will be described for the purpose of comprehension of the present invention.

Figure 1:
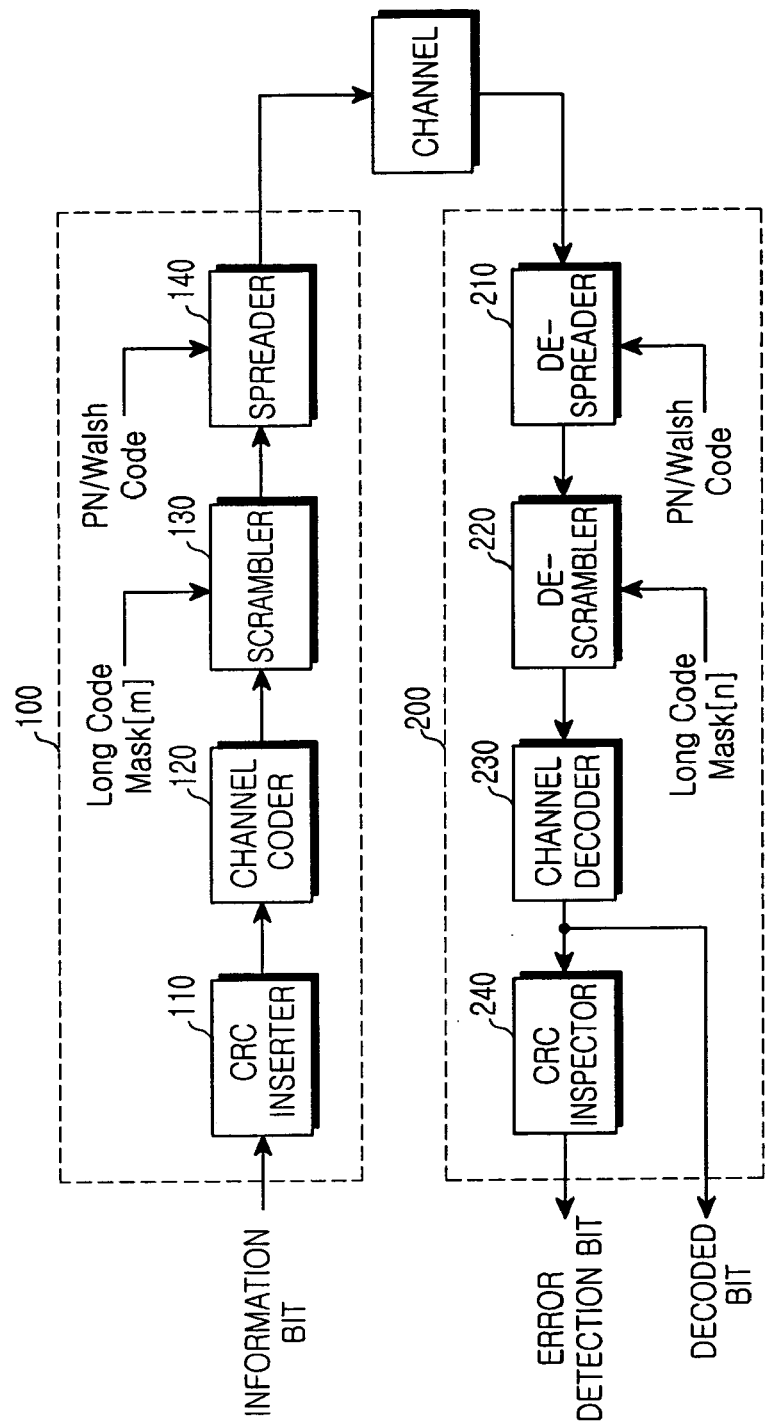
FIG. 1 is a block diagram illustrating a transmitter and a receiver in a conventional mobile communication system.
Figure 2:
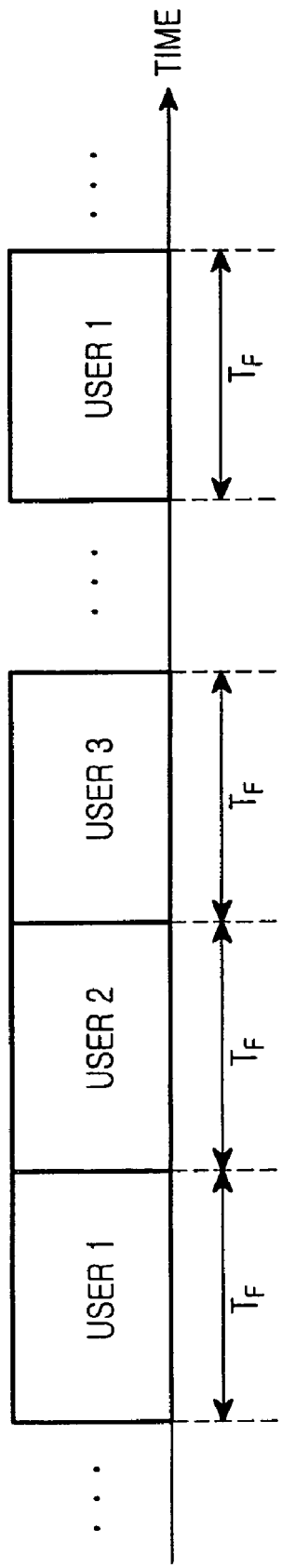
FIG. 2 is a schematic diagram illustrating a control channel through which control information is transmitted using a time division multiplexing (TDM) scheme in the conventional mobile communication system.
Figure 3A:
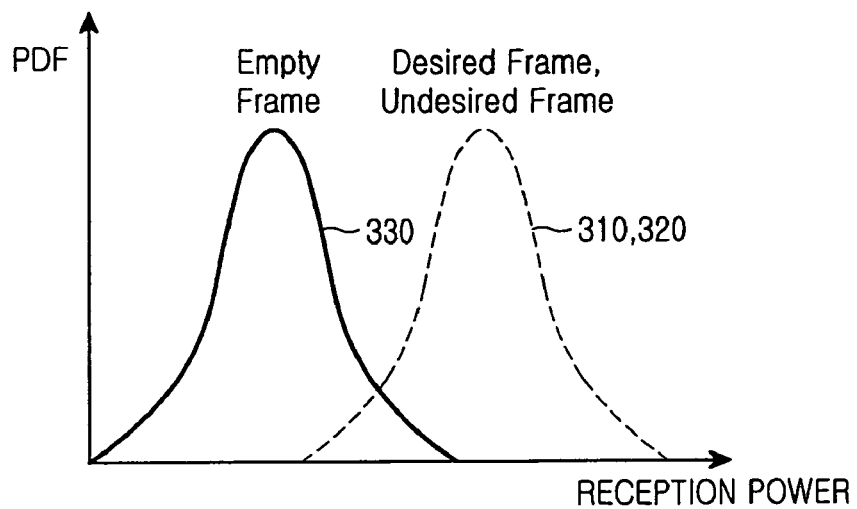
FIG. 3A are graphs illustrating a conventional method for determining a reception error of a frame based on reception power for a TDM frame in a mobile communication system.

FIG. 3A is a graph illustrating the method for determining the reception error of the frame based on reception power for a TDM frame in a mobile communication system. A dotted line shown in FIG. 3A represents first and second frames 310 and 320 which have control information to be transmitted to users, and a solid line shown in FIG. 3A represents a third frame 330 which has no control information. The first frame 310 is a desired frame having control information to be transmitted to a specific user, the second frame 320 is an undesired frame having control information to be transmitted to other users, and the third frame 330 is an empty frame.

FIG. 3A shows a probability density function (PDF) according to the reception power for the first to third frames 310 to 330. However, if the reception error of the frame is determined only based on the reception power for the frame, it is difficult to distinguish the first frame 310 from the second frame 320 when the reception power for the first frame 310 is similar to the reception power for the second frame 320.

Figure 3B:
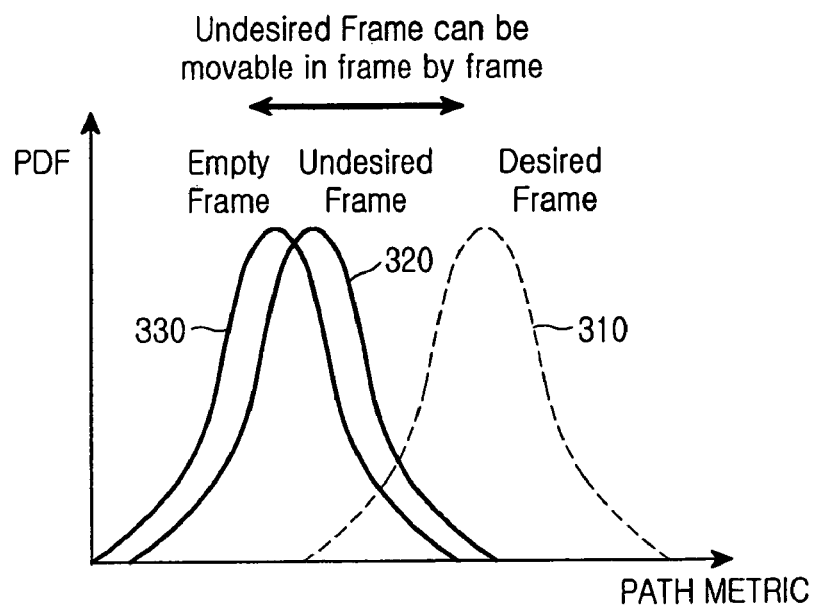
FIG. 3B are graphs illustrating a conventional method for determining a reception error of a frame based on a path metric of a TDM frame in a mobile communication system.

FIG. 3B is a graph illustrating a method for determining the reception error of the frame based on the path metric of the TDM frame in a mobile communication system. FIG. 3B shows the PDF according to the path metric of the first to third frames 310 to 330.

The path metric may be obtained by using a maximum correlation value selected from among correlations values between the received bit array and the postulated code word, or by using a minimum Euclidean distance or a minimum squared Euclidean distance between the received bit array and the postulated code word. In FIG. 3B, the maximum correlation value is used for the path metric.

The path metric can be obtained based on an output of a Viterbi decoder, which is used as a channel decoder of the receiver 200. That is, according to the PDF of the path metric obtained from the output of the Viterbi decoder, if the second frame 320 for other users is received in the receiver 200, the frame signals are descrambled in the receiver 200 based on the mutually different long codes, so that the input signal of the Viterbi decoder does not match with the code word. Therefore, the second frame 320 represents characteristics similar to those of the third frame 330, which does not have the control information, so that it is possible to distinguish the second frame 320 from the first frame 310.

Figure 4:
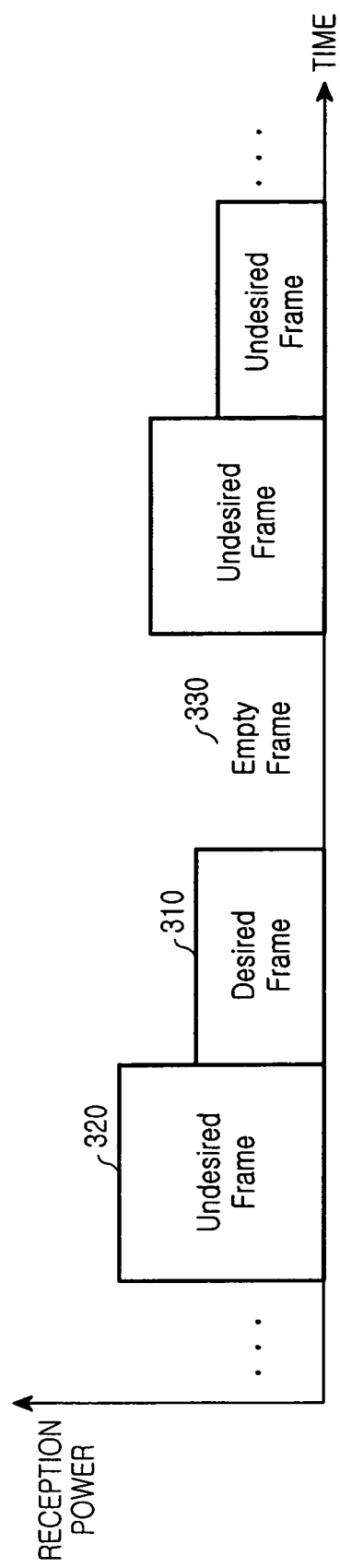
FIG. 4 is a diagram illustrating variations in reception power for TDM frames according to a conventional power control method in a mobile communication system.

However, as shown in FIG. 4, since the first to third frames 310 to 330 may be transmitted to predetermined receivers using the TDM scheme with the power control in the mobile communication system, the reception power of the receivers per each frame may significantly vary. Accordingly, the path metric of the second frame 320 transmitted to other users also varies, so that it is difficult to distinguish the frames 310 to 330 if the path metric of the frames is only used as shown in FIG. 3B.

The frame error detection method using the reception power for the frames or the path metric of the frames does not provide a stable result, so that problems may occur if the above methods are applied to a frame reliability test after the CRC test has been performed. In order to solve the above problems, according to the first embodiment of the present invention, the reception power for the frames and the path metric of the frames are simultaneously used for detecting the reception error of the frame. In addition, a characteristic equation is suggested in order to estimate the second path metric by taking the first path metric and the reception power for the frame into consideration based on a proportion between the first path metric and the reception power. The second path metric obtained through the characteristic equation is compared with the predetermined threshold value of the path metric, thereby determining the validity of the reception frame. Furthermore, the frame error detection is carried out together with the CRC inspection, thereby improving reliability for the frame error detection.

Figure 5:
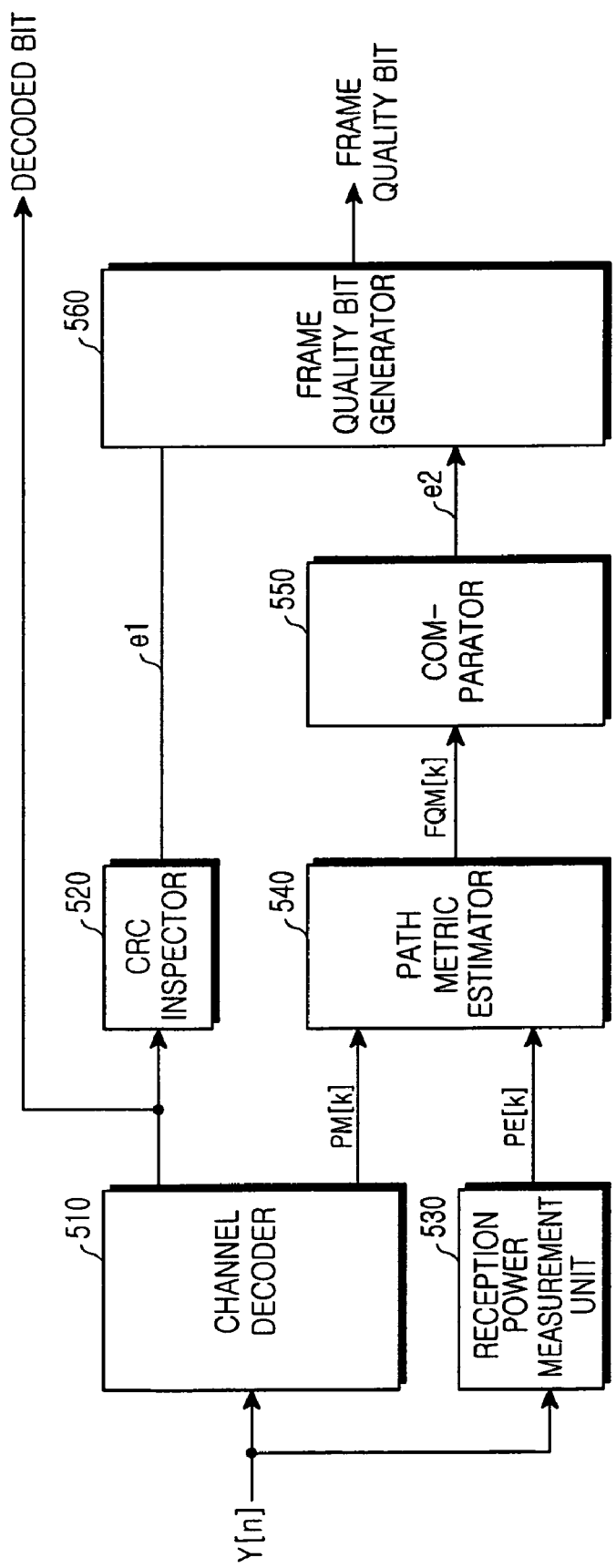
FIG. 5 is a block diagram illustrating an internal structure of a TDM frame detection unit in a mobile communication system according to a first embodiment of the present invention.

FIG. 5 is a block diagram illustrating an internal structure of a TDM frame detection unit of a receiver in a mobile communication system according to the first embodiment of the present invention. The receiver shown in FIG. 5 employs a forward dedicated control channel (F-DCCH) as a control channel in such a manner that users can share the control channel using the TDM scheme and determines the validity of the frame received therein through the control channel based on the frame error detection scheme according to an embodiment of the present invention.

In FIG. 5, a channel decoder 510 decodes the frame bit array, that is, input signals (Y[n]: n=1, 2, . . . , N, wherein N is a number of symbols in a frame interval) received therein through a radio channel and sends the decoded bits to a CRC inspector 520. If a convolution coder is used as a channel coder of a transmitter, a Viterbi decoder is used as the channel decoder 510. The CRC inspector 520 checks for the reception errors in the frame by using CRC bits included in the decoded bits and outputs a first error detection bit (e1).

The channel decoder 510 has a predetermined code word set for estimating the first path metric. In addition, the channel decoder 510 estimates the maximum correlation value between the bit array of the reception frame and the code word set in order to output the first path metric (PM[k]). Also, the channel decoder 510 estimates the minimum Euclidean distance or the minimum squared Euclidean distance between the bit array of the reception frame and the code word set in order to output the first path metric (PM[k]). The channel decoder 510 outputs the code word as decoded bits if the maximum correlation value for the code word has been found.

In addition, a reception power measurement unit 530 shown in FIG. 5 measures reception power (PE[k]) for the corresponding frame from the input signal (Y[n]) and sends the reception power to a path metric estimator 540. Hereinafter, the structure and operation of the reception power measurement unit 530 will be described in detail with reference to FIG. 6.

Figure 6:
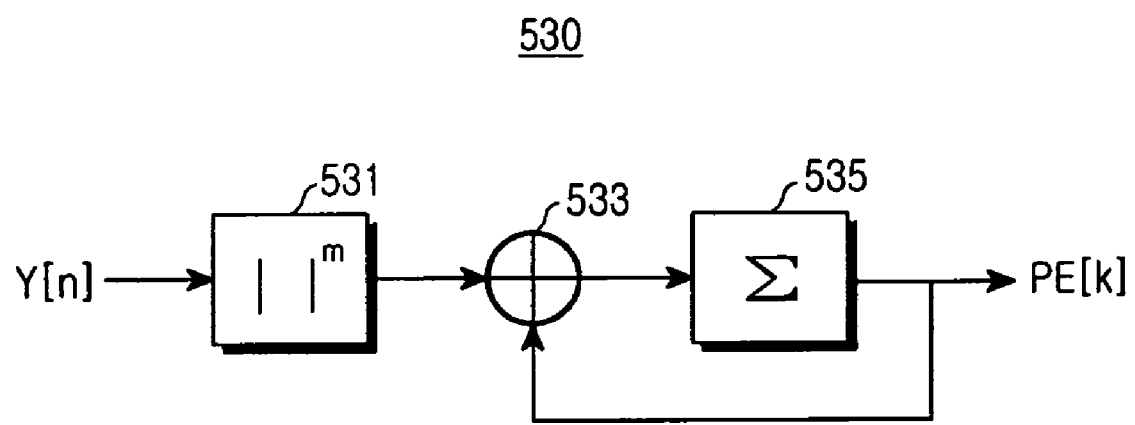
FIG. 6 is a block diagram illustrating an internal structure of a reception power measurement unit shown in FIG. 5 according to a first embodiment of the present invention.

FIG. 6 is a block diagram illustrating an internal structure of the reception power measurement unit 530 shown in FIG. 5. As shown in FIG. 6, the reception power measurement unit 530 performs a $m_{th}$-power operation 531 with respect to an absolute value ($|\ |^m$) of the input signal Y[n] and accumulates the value thereof during one frame interval 533 and 535. Then, the reception power measurement unit 530 outputs the accumulated value as the reception power (PE[k]) of the corresponding frame. Herein, n is a symbol index and k is a frame index. In addition, the degree of m is basically "1". In this case, the first path metric (PM[k]) output from the channel decoder 510 can be expressed as a linear combination of the input signal Y[n].

The path metric estimator 540 shown in FIG. 5 estimates the second path metric (FQM[k]) for determining the validity of the reception frame by using the proportion between the first path metric (PM[k]) calculated from the channel decoder 510 and the reception power (PE[k]) calculated from the reception power measurement unit. The second path metric (FQM[k]) can be estimated through two schemes, which will be described below, depending on algorithms used for calculating the path metric. In addition, the first embodiment of the present invention suggests two characteristic equations for defining the above proportional relationship, which will be described later in detail.

Accordingly, it should be noted that various patterns of the second path metric (FQM[k]) can be obtained corresponding to a number of algorithms×a number of characteristic equations. As mentioned above, according to the first embodiment of the present invention, the algorithm for estimating the path metric may use the maximum correlation value between the bit array and the code word of the reception frame, and the minimum Euclidean distance or the minimum squared Euclidean distance between the bit array and the code word of the reception frame. Hereinafter, a basic principle of estimating the second path metric (FQM[k]) will be described.

First, when the first path metric (PM[k]) is estimated by using the maximum correlation value, if the receiver decodes a frame allocated thereto, a relatively large path metric is obtained. In contrast, if the receiver decodes a frame having noise components without control information, a relatively small path metric is obtained. In addition, if the receiver decodes a frame allocated to the other user, a relatively small path metric is obtained. At this time, the path metric is proportional to the reception power for the frame.

Accordingly, the frame allocated to the receiver may have a relatively large path metric in comparison with the reception power for the frame, and the frame allocated to the other receiver may have a relatively small path metric in comparison with the reception power for the frame. Thus, the second path metric (FQM[k]) can be estimated based on the proportion between the path metrics of the frames.

Second, when the first path metric (PM[k]) is estimated by using the minimum Euclidean distance or the minimum squared Euclidean distance, if the receiver decodes a frame allocated thereto, a relatively small path metric is obtained. In contrast, if the receiver decodes a frame having noise components without control information, a relatively large path metric is obtained. In addition, if the receiver decodes a frame allocated to the other user, a relatively large path metric is obtained. At this time, the path metric is inversely proportional to the reception power for the frame.

Accordingly, the frame allocated to the receiver may have a relatively small path metric in comparison with the reception power for the frame, and the frame allocated to the other receiver may have a relatively large path metric in comparison with the reception power for the frame. Thus, the second path metric (FQM[k]) can be estimated based on the proportion between the path metrics of the frames.

In the meantime, if the Viterbi decoder is used as a channel decoder capable of outputting the maximum correlation value, the characteristic equations defining the proportion between the first path metric (PM[k]) and the reception power (PE[k]) are represented as Equations 1 and 2. The path metric estimator 540 shown in FIG. 5 may operate based on one of Equations 1 and 2:

$$FQM[k] = \frac{PM[k]}{PE[k]} \qquad \text{Equation 1}$$

According to Equation 1, a ratio of the first path metric (PM[k]) output from the channel decoder 510 to the reception power (PE[k]) output from the reception power measurement unit 530 is estimated as the second path metric (FQM[k]):

$$FQM[k] = PM[k] - \alpha PE[k] \qquad \text{Equation 2}$$

According to Equation 2, a differential value between the first path metric (PM[k]) and the reception power (PE[k]) multiplied by a weight ($\alpha$) is estimated as the second path metric (FQM[k]). That is, the frame allocated to the receiver can be distinguished from the frames allocated to other users based on the weight ($\alpha$). According to the test result performed by a user in accordance with an embodiment of the present invention, the frames can be efficiently distinguished from each other when the weight ($\alpha$) has a value of about 0.06. However, the value of the weight ($\alpha$) can be properly changed by taking the type of mobile communication systems or variation of communication environment into consideration.

In the meantime, the second path metric (FQM[k]) obtained through Equation 1 does not sensitively depend on the fading channel or the location of the receiver as compared with that obtained through Equation 2. In addition, the second path metric (FQM[k]) obtained through Equation 2 represents the superior frame distinguishment performance as compared with that of the first second path metric (FQM[k]) obtained through Equation 1. Thus, it is necessary to properly estimate the second path metric (FQM[k]) by taking communication environment into consideration.

The second path metric (FQM[k]) estimated through the above manner is transmitted to a comparator 550. Thus, the comparator 550 compares the second path metric (FQM[k]) with a predetermined threshold value of the path metric and outputs a second error detection bit (e2) for determining the validity of the reception frame.

If the first path metric has been estimated by using the maximum correlation value, the comparator 550 outputs the second error detection bit (e2) indicating that the reception frame is a valid frame when the second path metric is larger than the threshold value of the path metric. In contrast, when the second path metric is smaller than the threshold value of the path metric, the comparator 550 outputs the second error detection bit (e2) indicating that the reception frame has an error.

In addition, if the channel decoder 510 estimates the first path metric by using the minimum Euclidean distance or the minimum squared Euclidean distance, Equations 1 and 2 applied to the path metric estimator 540 shown in FIG. 5 are changed into Equations 3 and 4:

$$FQM[k]=PM[k]PE[k] \quad \text{Equation 3}$$

$$FQM[k]=PM[k]-\beta/PE[k] \quad \text{Equation 4}$$

The weigh ($\beta$) shown in Equation 4 can be obtained through various tests. In this case, the comparator 550 outputs the second error detection bit (e2) indicating that the reception frame is a valid frame when the second path metric is smaller than the threshold value of the path metric. In contrast, when the second path metric is larger than the threshold value of the path metric, the comparator 550 outputs the second error detection bit (e2) indicating that the reception frame has an error.

In addition, Equations 3 and 4 can be replaced with Equations 5 and 6. In the case of Equations 5 and 6, the comparator 550 outputs the second error detection bit (e2) indicating that the reception frame is a valid frame when the second path metric is larger than the threshold value of the path metric. In contrast, when the second path metric is smaller than the threshold value of the path metric, the comparator 550 outputs the second error detection bit (e2) indicating that the reception frame has an error:

$$FQM[k] = \frac{PE[k]}{PM[k]} \quad \text{Equation 5}$$

$$FQM[k]=1/PM[k]-\gamma PE[k] \quad \text{Equation 6}$$

The weigh ($\gamma$) shown in Equation 6 can be obtained through various tests. In addition, a frame quality bit generator 560 shown in FIG. 5 receives the first error detection bit (e1) output from the CRC inspector 520 and the second error detection bit (e2) output from the comparator 550 and outputs a predetermined frame quality bit used for finally determining the validity of the reception frame. The frame quality bit generator 560 determines the reception frame as a valid frame only when the first and second error detection bits (e1 and e2) indicate that the reception frame is the valid frame. Otherwise, the frame quality bit generator 560 generates a frame quality bit indicating that the reception frame has an error.

In the meantime, if the first error detection bit (e1) of the CRC inspector 520 is primarily output to the frame quality bit generator 560 while indicating that the reception frame has an error, it is preferred to omit the procedure of outputting the second error detection bit (e2). In this case, although it is not illustrated in FIG. 5, the frame quality bit generator 560 or a separate control unit may control the channel decoder 510 and the reception power measurement unit 530 based on the result of the first error detection bit (e1) in such a manner that the second error detection bit (e2) can be selectively output.

This embodiment of the present invention determines the reception error of the frame by taking the path metric of the frame and the reception power for the frame into consideration after performing the CRC test, thereby improving the reliability for the frame error detection. In addition, the TDM frame detection scheme is not only applicable for the F-DCCH, but also applicable for physical channels transmitting data to a plurality of users through the TDM scheme by using one physical channel.

Figure 7:
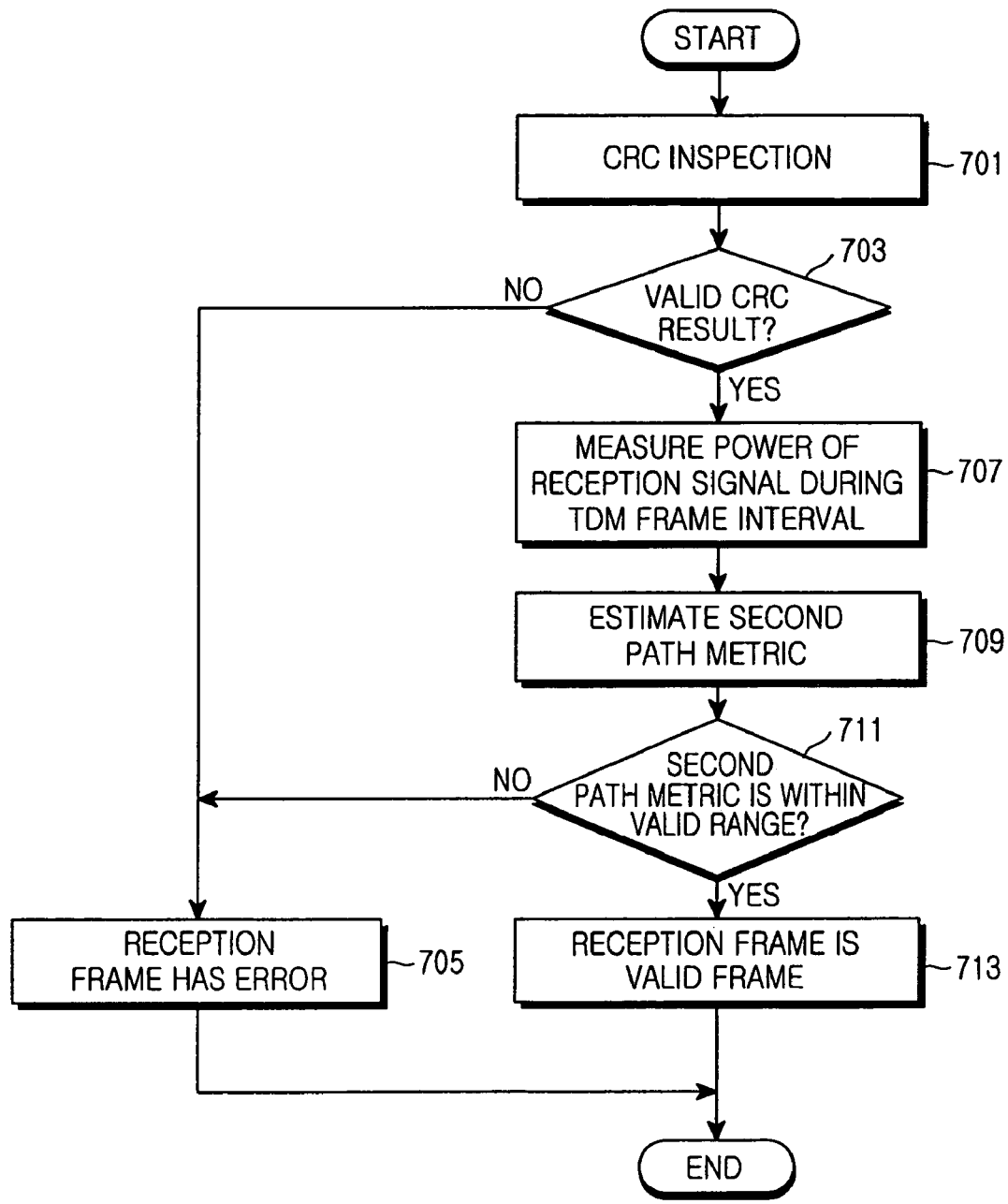
FIG. 7 is a flowchart illustrating a procedure of detecting a TDM frame in a mobile communication system according to a first embodiment of the present invention.

FIG. 7 is a flowchart illustrating a procedure of detecting a TDM frame in a mobile communication system according to the first embodiment of the present invention.

Referring to FIG. 7, the channel decoder 510 decodes the reception frame and sends the decoded bits to the CRC inspector 520 at step 701. The CRC inspector 520 extracts and inspects the CRC bits included in the frame of the decoded bits and outputs the first error detection bit (e1) for determining the validity of the reception frame to the frame quality bit generator 580.

Then, the frame quality bit generator 580 reads the first error detection bit in order to determine whether the reception frame is the valid frame or the invalid frame having the error at step 703. If it is determined at step 703 that the reception frame is the invalid frame, the decoded bits of the frame output from the channel decoder 510 are determined as invalid bits at step 705 and the result thereof is transmitted to an upper class terminal (not shown).

In contrast, if it is determined at step 703 that the reception frame is the valid frame, the frame quality bit generator 580 waits for the second error detection bit (e2) output from the comparator 550. In addition, the reception power measurement unit 530 performs the $m_{th}$-power operation with respect to the absolute value of the input signal Y[n] and accumulates the value thereof during one frame interval, thereby obtaining the reception power (PE[k]) for the frame at step 707. Then, the reception power measurement unit 530 sends the reception power (PE[k]) for the frame to the path metric estimator 540.

At the same time, the channel decoder 510 estimates the first path metric (PM[k]) by using the maximum correlation value between the bit array and the code word of the reception frame, or by using the minimum Euclidean distance or the minimum squared Euclidean distance between the bit array and the code word of the reception frame and sends the first path metric (PM[k]) to the path metric estimator 540. Thus, the path metric estimator 540 estimates the second path metric (FQM[k]) by using one of Equations 1 and 2, which define the proportion between the first path metric (PM[k]) output from the channel decoder 510 and the reception power (PE[k]) output from the reception power estimator 530 at step 709. Then, the path metric estimator 540 sends the second path metric (FQM[k]) to the comparator 550.

After that, the comparator 550 compares the second path metric (FQM[k]) output from the path metric estimator 540 with the predetermined threshold value of the path metric and outputs the second error detection bit (e2) indicating whether the second path metric (FQM[k]) is within a predetermined range, that is, whether the reception frame is the valid frame at step 711. At this time, the comparator 550 may compare the second path metric (FQM[k]) with the predetermined threshold value of the path metric using various methods according to the factors used for estimating the first path metric, such as the maximum correlation value, the minimum Euclidean distance or the minimum squared Euclidean distance.

That is, if the comparator 550 compares the second path metric (FQM[k]) with the predetermined threshold value of the path metric after the first path metric has been estimated according to the maximum correlation value, the comparator 550 determines the reception frame as a valid frame when the second path metric (FQM[k]) of Equation 1 or Equation 2 is larger than the threshold value of the path metric. In contrast, if the comparator 550 compares the second path metric (FQM[k]) with the predetermined threshold value of the path metric after the first path metric has been estimated according to the minimum Euclidean distance or the minimum squared Euclidean distance, the comparator 550 determines the reception frame as a valid frame when the second path metric (FQM[k]) of Equation 3 or Equation 4 is smaller than the threshold value of the path metric. In addition, the comparator 550 determines the reception frame as a valid frame if the second path metric (FQM[k]) of Equation 5 or Equation 6 is larger than the threshold value of the path metric.

In the meantime, if the second path metric is estimated by using reciprocal values of Equations 1 to 6, the comparator 550 determines the valid frame inversely to the above method by comparing the second path metric of the reception frame with the threshold value of the path metric. For instance, when the second path metric is estimated by using the reciprocal values of Equation 2, the comparator 550 determines the reception frame as a valid frame when the second path metric of Equation 2 is smaller than the threshold value of the path metric.

Then, the frame quality bit generator 560 shown in FIG. 5 receives the first error detection bit (e1) output from the CRC inspector 520 and the second error detection bit (e2) output from the comparator 550 and outputs a predetermined frame quality bit used for finally determining the validity of the reception frame, that is, the frame quality bit generator 560 outputs the frame quality bit used for determining the validity of the output of the channel decoder if the first and second error detection bits (e1 and e2) indicate that the reception frame is the valid frame at step 713. The frame quality bit is transmitted to the upper class terminal.

In contrast, if it is determined at step 711 that the second path metric (FQM[k]) is within the error range, the second error detection bit (e2) indicating the error of the frame is transferred to the frame quality bit generator 560. Thus, the frame quality bit generator 560 outputs the frame quality bit indicating that the reception frame, that is, the output of the channel decoder is invalid and sends the frame quality bit to the upper class terminal.

Hereinafter, performance test results of the TDM frame detection method in the control channel according the first embodiment of the present invention will be described with reference to FIGS. 8 to 10.

Figure 8:
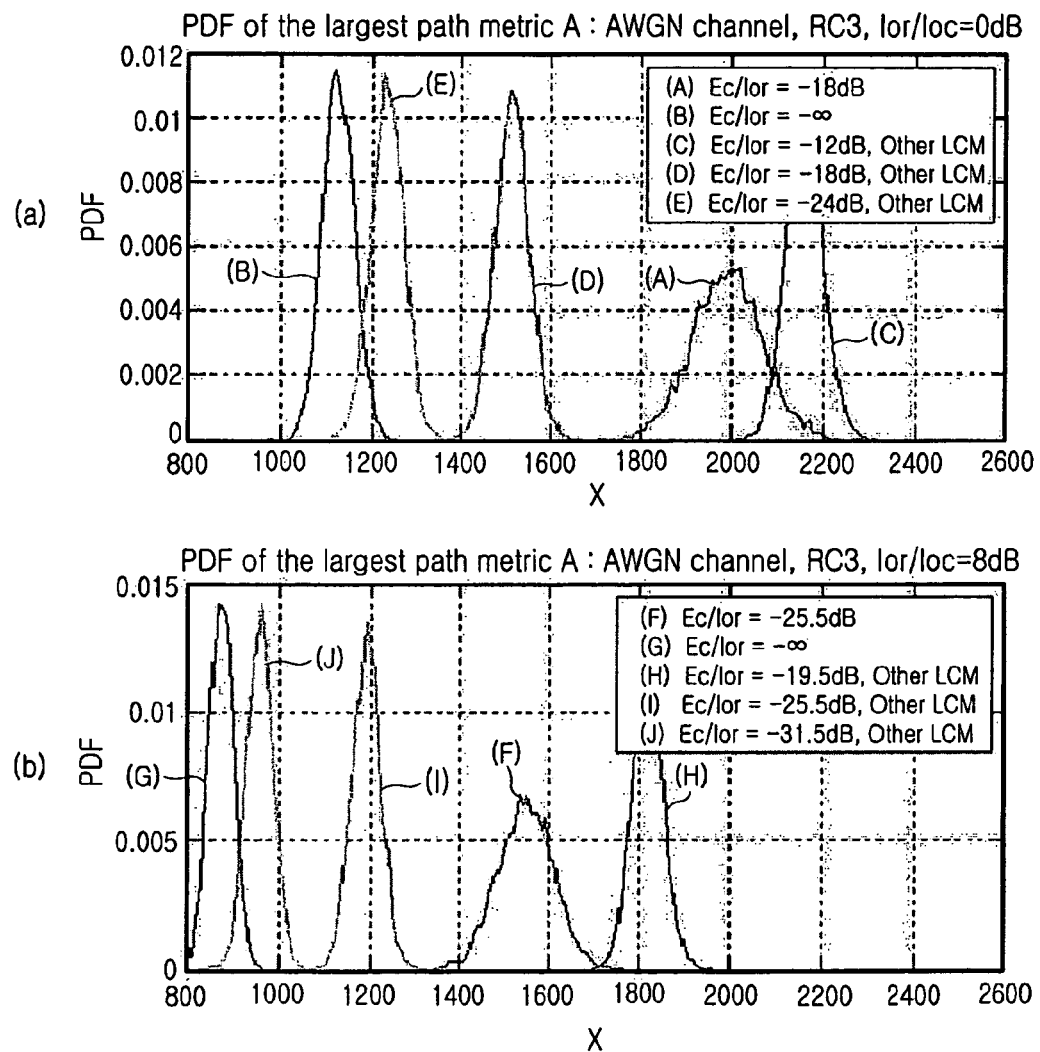
FIG. 8 is a graph illustrating a performance test result of a conventional TDM frame detection method.
Figure 9:
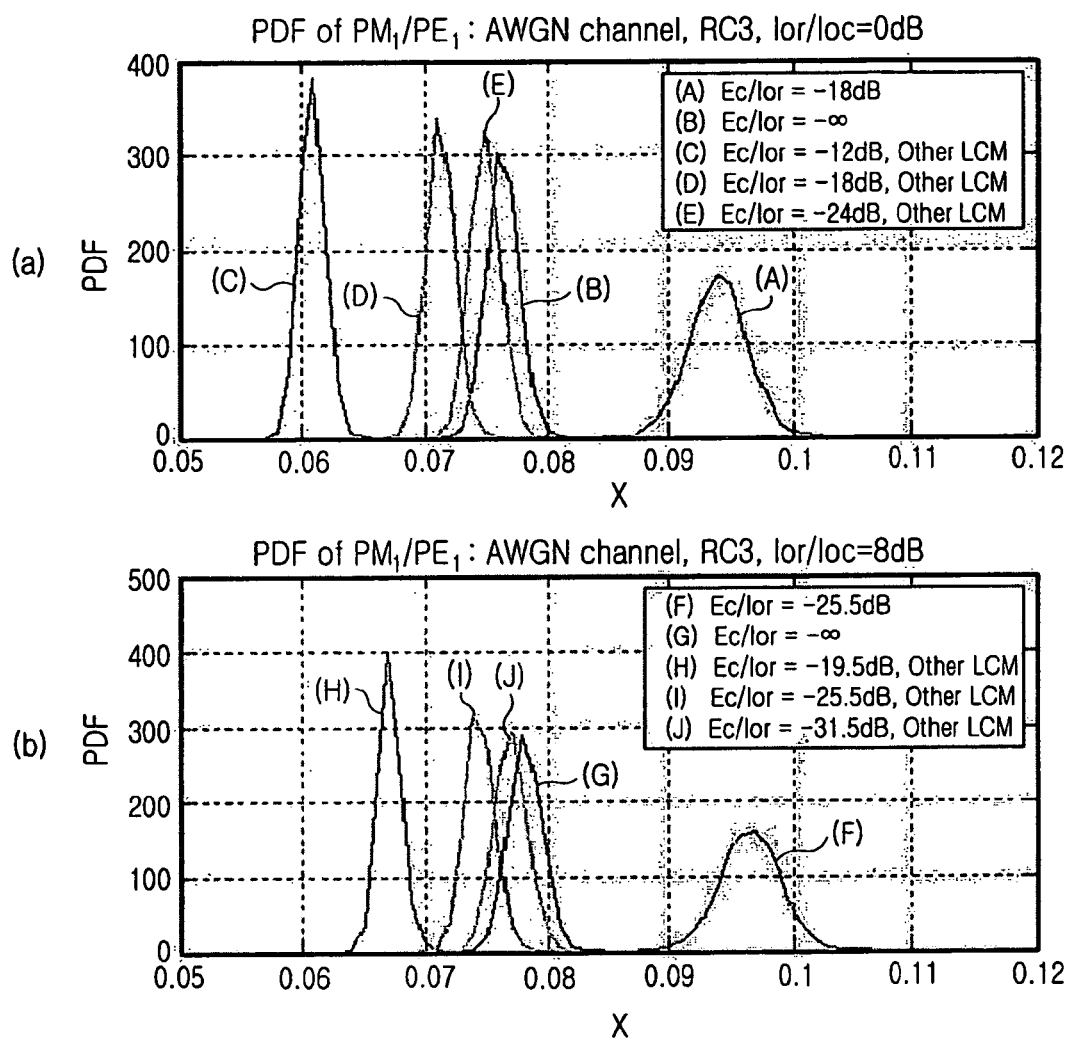
FIGS. 9 and 10 are graphs illustrating performance test results of a TDM frame detection method according to a first embodiment of the present invention.
Figure 10:
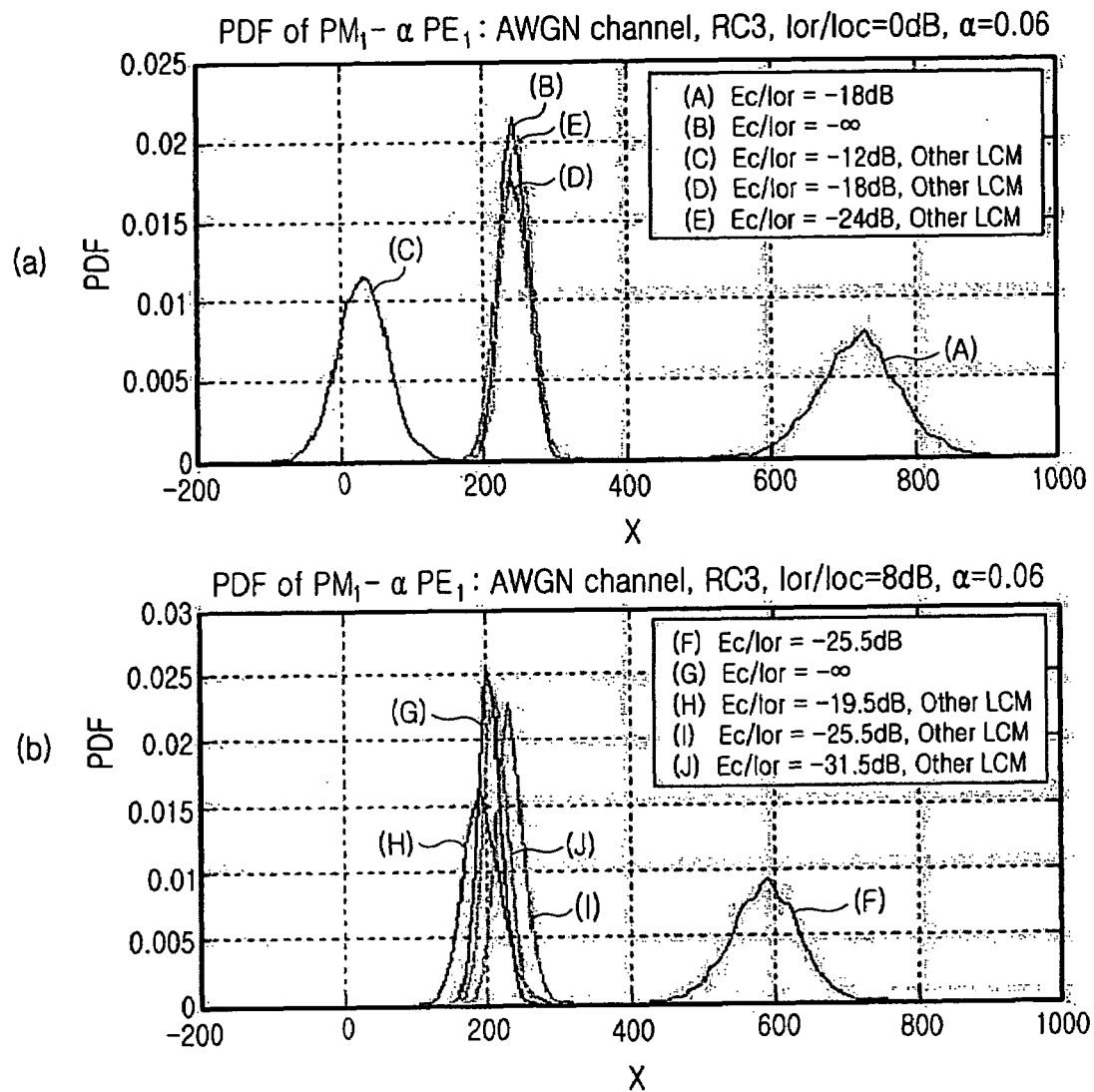

The test results shown in FIGS. 8 to 10 are obtained by estimating the path metric based on the maximum correlation value. In FIGS. 8 to 10, first frames allocated to the user are represented as reference characters (A) and (F). In addition, second frames allocated to other users are represented as reference characters (C) to (E) and (H) to (J) and third frames having no control information are represented as reference characters (B) and (G). In addition, (a) and (b) of FIGS. 8 to 10 show the PDFs of the path metric output from the channel decoder when a location of a mobile station satisfies Ior/Ioc=0 dB (a) and Ior/Ioc=8 dB (b), respectively.

FIG. 8 are graphs illustrating performance test results of a conventional TDM frame detection method when the path metric is only used. Referring to FIG. 8, since the mobile station is under the power control state, the path metric values for the second frames C to E and H to J allocated to other users cannot be precisely distinguished from the path metric value for the first frames A and F allocated to the mobile station.

FIG. 9 is a graph illustrating the performance test result of a TDM frame detection method according to the first embodiment of the present invention, in which the second path metric is estimated by using Equation 1. Referring to FIG. 9, the second frames C to E and H to J allocated to other users have a path metric smaller than that of the third frames B and G having no control information, so the frame detection performance may be significantly improved. In addition, the frames can be easily distinguished from each other regardless of the location of the mobile station, so the FAR, which is a probability of an error under the "Good" state of the CRC result, can be significantly reduced.

FIG. 10 are graphs illustrating the performance test results of a TDM frame detection method according another embodiment of the present invention, in which the second path metric is estimated by using Equation 2. Referring to FIG. 10, the second frames C to E and H to J allocated to other users have the small path metric similar to that of the third frames B and G having no control information, so the frame detection performance may be significantly improved. Although frame detection may be influenced by the location of the mobile station, the frames can be easily distinguished from each other. Thus, the FAR can be significantly reduced.

It can be understood from FIGS. 9 and 10 that it is advantageous to use the second path metric obtained through Equation 1 than the second path metric obtained Equation 2 if there are location variations of the mobile station. In addition, it is advantageous to use the second path metric obtained through Equation 2 than the second path metric obtained through Equation 1 if the location of the mobile station has been determined because it can improve differentiation performance between the first and third frames.

As described above, according to the first embodiment of the present invention, it is possible to improve reception reliability for control channels by easily detecting the TDM frame, which is allocated to each user and transmitted through the control channels in the mobile communication system providing the broadcast services.

In addition, according to the first embodiment of the present invention, the TDM frame transmitted through the control channel for each user can be stably detected regardless of location variations of the mobile station and the frames can be stably received in the mobile station. Thus, it is not necessary to change or retransmit the control information, thereby saving system resources and improving cell throughput.

Second Embodiment

According to the second embodiment of the present invention, the FAR can be reduced by simultaneously performing two schemes.

The CRC inspection method is used in the second embodiment of the present invention in order to detect an error of a frame received in the mobile station. In addition, a location of a power control bit (PCB) of the F-DCCH, which is commonly used for broadcast services, is randomly determined according to the long code mask allocated to each mobile station. The value of the power control bit transmitted from the above location may be the same during one frame. That is, in a case of a frame transmitted to a specific mobile station, since the power control bit has the same value during one frame, a large accumulated value can be obtained by accumulating the value of the power control bit. However, for a frame transmitted to other mobile stations, value accumulation is performed in a predetermined location, which is determined according to the long code of the receiver 200 regardless of the data and power control bit, so the accumulated value is set to "0" or substantially equals to "0". In addition, in a case of a frame having no control signal, only noise signals are accumulated so that the frame has a very low accumulated value.

Thus, this embodiment of the present invention provides a method for determining whether the channel is correctly received through the F-DCCH by using the CRC inspection result and the value of he power control bit.

Figure 11:
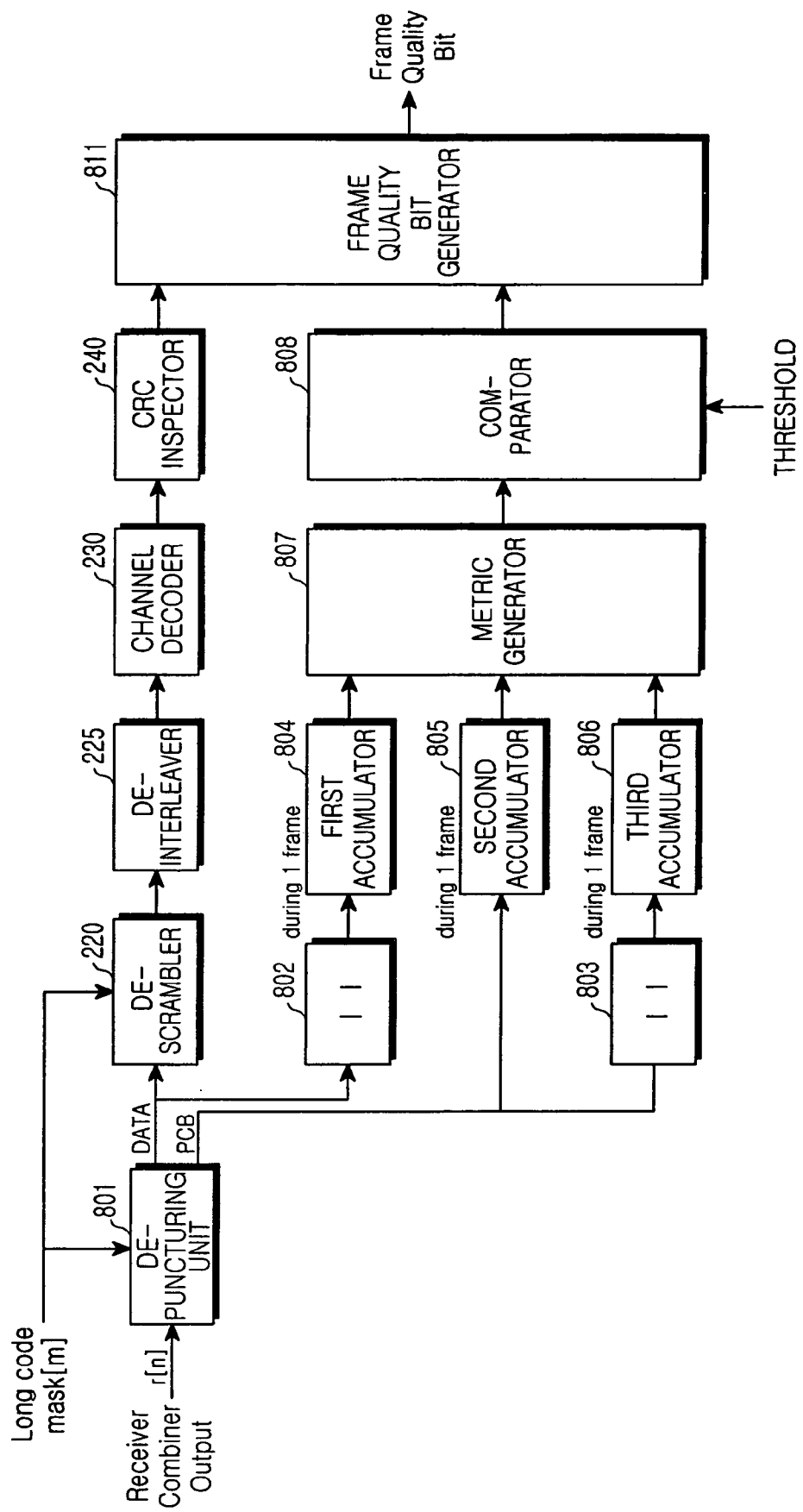
FIG. 11 is a block diagram illustrating an internal structure of a DCCH receiver in a mobile station according to a second embodiment of the present invention.

FIG. 11 is a block diagram illustrating an internal structure of a DCCH receiver according to the second embodiment of the present invention. Hereinafter, the structure and operation of the DCCH receiver according to the second embodiment of the present invention will be described in detail with reference to FIG. 11.

A depuncturing unit 801 shown in FIG. 11 receives a despread symbol array r[n] from a transmitter 100 in order to depuncture the despread symbol array r[n] by using a long code mask value allocated to the mobile station. The depuncturing unit 801 according to an embodiment of the present invention divides a data symbol array of the depunctured symbols into two branches, in which one branch is connected to a descrambler 220 and the other branch is connected to a first absolute value calculator 802. In addition, the depuncturing unit 801 outputs the power control bit separately from the data. The value of the power control bit is not an actual value of the power control bit, but a value of a dummy bit included in the transmitter. A CPCCH, which is a separate power control channel, is allocated to the dummy bit, so that the power control bit is not transmitted to the dummy bit through the F-DCCH which is commonly used. The dummy bit is inserted in order to maintain a format of data transmitted in the mobile communication system, in which the dummy bit has the same value during one frame.

Since the power control bit is not the actual power control bit, it will be referred to as a "pseudo power control bit" in the following description. The pseudo power control bit output from the depuncturing unit 801 is also divided into two branches, in which one branch is input into a second accumulator 805 and the other branch is input into a second absolute value calculator 803.

Hereinafter, a description will be made in relation to a proceeding path of the data.

One of the two branched data output from the depuncturing unit 801 is input into the descrambler 220. The descrambler 220 descrambles the data by using the long code mask, which is discretely or commonly allocated to a plurality of mobile stations for the purpose of broadcast services. Such descrambled data are input into a deinterleaver 225. The deinterleaver 225 deinterleaves control information and outputs the deinterleaved control information in order to prevent a burst error when transmitting the control information. The data output from the deinterleaver 225 are input into a channel decoder 230 so that the channel decoding is performed with respect to the data. The channel decoder 230 comprises a Viterbi decoder. The channel-decoded information is input into a CRC inspector 240 so that CRC bits of the channel-decoded information are inspected in the CRC inspector 240 in order to determine whether the error occurs in the information while the information is being transmitted through the channel. In addition, the CRC inspector 240 outputs the result and the decoded value of the result. The information output from the CRC inspector 240 is input into a frame quality bit generator 811.

In addition, the other branched data output from the depuncturing unit 801 are input into the first absolute value calculator 802. The first absolute value calculator 802 calculates an absolute value of the data and sends it into the first accumulator 804. The first accumulator 804 accumulates the absolute values of the data during one frame and sends them to a metric generator 807 according to the present invention. The metric generator 807 will be described later in detail.

In addition, the pseudo power control bit output from the depuncturing unit 801 is also divided into two branches one of which is input into the second accumulator 805. The second accumulator 805 accumulates the value of the pseudo power control bit during one frame and sends the accumulated value of the pseudo power control bit into the metric generator 807. In addition, the other branch is input into the second absolute value calculator 803. Thus, the second absolute value calculator 803 takes an absolute value of the pseudo power control bit and sends the absolute value to a third accumulator 806. The third absolute value accumulator 806 accumulates the absolute value of the pseudo power control bit during one frame and sends the accumulated absolute value to the metric generator 807.

The metric generator 807 can generate the metric by using one of the following seven schemes. That is, the metric generator 807 may generate the metric by using the accumulated value of the pseudo power control bit, the accumulated absolute value of the pseudo power control bit, or the accumulated absolute value of the data symbols.

First, the metric generator 807 can generate the metric according to Equation 7:

$$\text{Metric } A = \sum_{n \in PCB} r[n] \qquad \text{Equation 7}$$

In Equation 7, PCB is a pseudo power control bit, and r[n] is a value which is depunctured in the depuncturing unit 801 and accumulated by means of the second accumulator 805. If the second accumulator 805 is only employed, Equation 7 can be used. That is, when the depuncturing unit 801 performs the depuncturing process, the depuncturing unit 801 outputs the pseudo power control bit value by using the long code mask value thereof in one frame. Accordingly, a great accumulated value of the pseudo power control bit is represented if the frame is received in the mobile station. However, if the frame is not received in the mobile station, the accumulated value of the pseudo power control bit is very low or similar to a noise value. In addition, if the frame has no control information, only the noise components are accumulated, so that the accumulated value of the pseudo power control bit is very low. Thus, the metric generator 807 can output the metric according to Equation 7.

Second, the metric generator 807 can generate the metric according to Equation 8:

$$\text{Metric } B = \frac{\left(\sum_{n \in PCB} r[n]\right)}{\left(\sum_{n \notin PCB} |r[n]|\right)} \qquad \text{Equation 8}$$

In Equation 8, PCB is a pseudo power control bit, and r[n] is a value which is depunctured in the depuncturing unit 801 and accumulated by means of the second accumulator 805. In addition, |r[n]| is a value which is depunctured in the depuncturing unit 801, calculated by the first absolute value calculator 802, and accumulated by means of the first accumulator 804. That is, a denominator in Equation 8 is obtained by taking an absolute value of r[n] using the first absolute value calculator 802 and accumulating the absolute value of r[n] using the first accumulator 804 when n is not the PCB.

If the metric is generated according to Equation 8, it is possible to compensate for an error which may occur in Equation 7. Specifically, when the mobile station receives the F-DCCH from a base station, a distance between the mobile station and the base station may vary. That is, the location of the mobile station may be continuously changed. Thus, an absolute value of reception power may vary depending on the location of the mobile station in a cell. Thus, it is assumed that the mobile station may receive a data part and a PCB part at the same location in the cell during one frame. Therefore, it is possible to compensate for variation derived from the location of the mobile station by using a ratio of accumulated values between the data part and the PCB part. In addition, each frame is subject to the power control for the mobile station, so frame power may be seriously varied, causing a fading channel effect in each frame unit. If the metric is obtained according to Equation 8, it is possible to compensate for the fading channel effect in each frame unit. In addition, it is also possible to compensate for a slow fading channel effect in each frame unit, so the mobile station can adaptively deal with the channel variation.

Third, the metric generator 807 can generate the metric according to Equation 9:

$$\text{Metric } C = \left(\sum_{n \in PCB} r[n]\right) - \alpha \cdot \left(\sum_{n \notin PCB} |r[n]|\right) \qquad \text{Equation 9}$$

Parameters used in Equation 9 are identical to those of Equations 7 and 8, except for α which is a constant obtained through various tests. Similar to Equation 8, Equation 9 also compensates for the error which may occur in Equation 7.

Fourth, the metric generator 807 can generate the metric according to Equation 10:

$$\text{Metric } D = \frac{\left(\sum_{n \in PCB} r[n]\right)}{\left(\sum_{n \in PCB} |r[n]|\right)} \qquad \text{Equation 10}$$

Parameters used in Equation 10 are identical to those of Equations 7 to 9. According to Equation 10, the metric is obtained by calculating a ratio of the accumulated value of the PCB to the accumulated absolute value of the PCB. Accordingly, a numerator in Equation 10 is obtained by accumulating the value of the PCB using the second accumulator 805 during one frame and a denominator in Equation 10 is obtained by taking the absolute value of the PCB using the second absolute value calculator 803 and accumulating the absolute value of the PCB using the third accumulator 806 during one frame. Equation 10 is similar to Equation 8, except that the accumulated absolute value of the PCB is used instead of the accumulated data value.

Fifth, the metric generator 807 can generate the metric according to Equation 11:

$$\text{Metric } E = \left(\sum_{n \in PCB} r[n]\right) - \beta \cdot \left(\sum_{n \in PCB} |r[n]|\right) \qquad \text{Equation 11}$$

Parameters used in Equation 11 are identical to those of Equations 7 to 10 except for β which is a constant obtained through various tests. According to Equation 11, the metric is obtained by subtracting an accumulated absolute value of the PCB multiplied by β from an accumulated value of the PCB. The antecedent term of Equation 11 signifies a value accumulated by the second accumulator 805 during one frame and the consequent term of Equation 11 signifies a value obtained by taking an absolute value of the PCB using the second absolute value calculator 803, accumulating the absolute value of the PCB using the third accumulator 806 during one frame, and multiplying the absolute value of the PCB by the constant β. Equation 11 is similar to Equation 9, except that the accumulated absolute value of the PCB is used instead of the accumulated data value.

Sixth, the metric generator 807 can generate the metric according to Equation 12:

$$\text{Metric } F = \frac{\left(\sum_{n \in PCB} r[n]\right)}{\left(\sum_{n \in Frame} |r[n]|\right)} \qquad \text{Equation 12}$$

Parameters used in Equation 12 are identical to those of Equations 7 to 11, except for Frame which means both data and PCB. According to Equation 12, the metric is obtained by calculating a ratio of the accumulated value of the PCB to the accumulated absolute value of Frame. Accordingly, a numerator in Equation 12 is obtained by accumulating the value of the PCB using the second accumulator 805 during one frame. In addition, a denominator in Equation 12 signifies the sum of data values accumulated during one frame by using the first absolute value calculator 802 and the first accumulator 804 and PCB values accumulated during one frame by using the second absolute value calculator 803 and the third accumulator 806.

Seventh, the metric generator 807 can generate the metric according to Equation 13:

$$\text{Metric } G = \left(\sum_{n \in PCB} r[n]\right) - \gamma \cdot \left(\sum_{n \in Frame} |r[n]|\right) \quad \text{Equation 13}$$

Parameters used in Equation 13 are identical to those of Equations 7 to 12 except for γ which is a constant obtained through various tests and Frame which means both data and PCB. The antecedent term of Equation 13 signifies a value accumulated by the second accumulator 805 during one frame. In addition, the consequent term of Equation 13 signifies the sum of data values accumulated during one frame by using the first absolute value calculator 802 and the first accumulator 804 and PCB values accumulated during one frame by using the second absolute value calculator 803 and the third accumulator 806, which is multiplied by the constant γ.

The metric generator 807 may generate the metric by using one of the above seven schemes. If the metric has been calculated, the metric value is input into a comparator 808. Upon receiving the metric value, the comparator 808 compares the metric value with a predetermined threshold value according to the above Equations.

Since it is assumed that the dummy symbol transmitted to the power control bit has a positive real number (for example: +1), if the metric value is larger than the predetermined threshold value, it is determined that the decoded signal is valid. In addition, if the metric value is smaller than the predetermined threshold value, it is determined that the decoded signal is invalid. If the dummy symbol transmitted to the power control bit has a negative real number (for example: −1), it is determined that the decoded signal is valid when the metric value is smaller than the predetermined threshold value and it is determined that the decoded signal is invalid when the metric value is larger than the predetermined threshold value. If the dummy symbol transmitted to the power control bit has plural values, the absolute value of accumulated values of the PCB part is compared with the predetermined threshold value. In this case, it is determined that the decoded signal is valid when the absolute value is larger than the predetermined threshold value and it is determined that the decoded signal is invalid when the absolute value is smaller than the predetermined threshold value. The above seven metrics can be replaced with the following seven metrics as shown in Equations 14 to 20, which correspond to Equations 7 to 13:

$$\text{Metric } A' = \left|\sum_{n \in 0} r[n]\right| \quad \text{Equation 14}$$

$$\text{Metric } B' = \frac{\left|\sum_{n \in 0} r[n]\right|}{\left[\sum_{n \notin PCB} r[n]\right]} \quad \text{Equation 15}$$

$$\text{Metric } C' = \left|\sum_{n \in 0} r[n]\right| - \alpha \cdot \left[\sum_{n \notin PCB} r[n]\right] \quad \text{Equation 16}$$

$$\text{Metric } D' = \frac{\left|\sum_{n \in 0} r[n]\right|}{\left[\sum_{n \in PCB} |r[n]|\right]} \quad \text{Equation 17}$$

$$\text{Metric } E' = \left|\sum_{n \in 0} r[n]\right| - \beta \cdot \left[\sum_{n \in PCB} |r[n]|\right] \quad \text{Equation 18}$$

$$\text{Metric } F' = \frac{\left|\sum_{n \in 0} r[n]\right|}{\left[\sum_{n \in Frame} |r[n]|\right]} \quad \text{Equation 19}$$

$$\text{Metric } G' = \left|\sum_{n \in 0} r[n]\right| - \gamma \cdot \left[\sum_{n \in Frame} |r[n]|\right] \quad \text{Equation 20}$$

In the above metrics, the absolute value can be replaced with a squared absolute value. In this case, the predetermined threshold value for the squared absolute value is properly selected. If the Euclidean distance or the squared Euclidean distance is calculated in the Viterbi decoder by using the path metric, a cord word having a minimum path metric is output. Thus, when the metric is compared with the predetermined threshold value, the valid state of the decoded signal is interchanged with the invalid state of the decoded signal.

Figure 12:
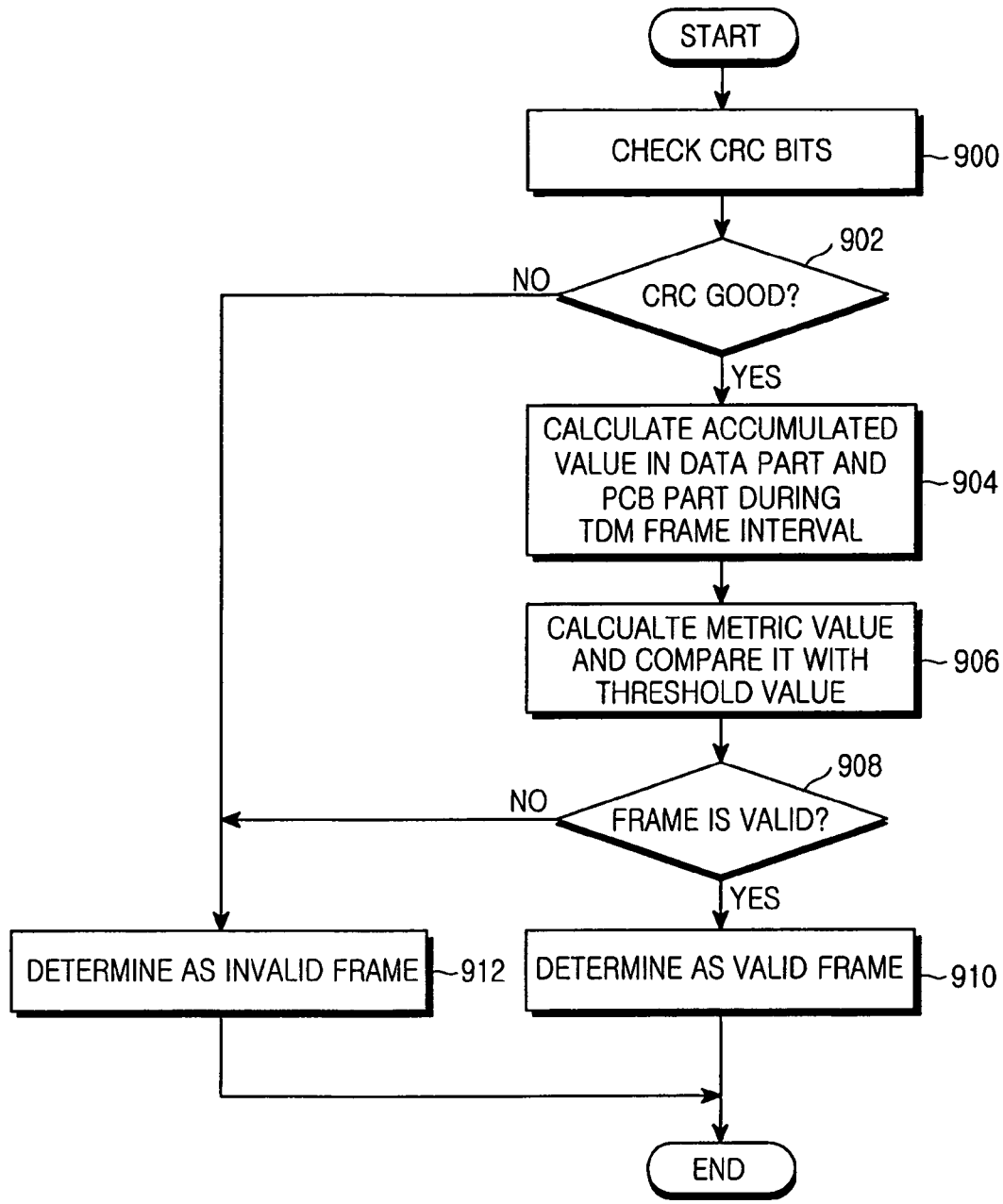
FIG. 12 is a flowchart illustrating a procedure of detecting a frame in a mobile communication system according to a second embodiment of the present invention.

The comparator 808 outputs the comparison result to a frame quality bit generator 811. The frame quality bit generator 811 checks the comparison result output from the comparator 808 only when the inspection result of the CRC inspector 240 represents that the decoded signal is valid. Accordingly, the frame quality bit generator 811 may generate a frame quality notification bit indicating the valid frame only when the values input into the frame quality bit generator 811 from the CRC inspector 240 and the comparator 808 are valid. Otherwise, the frame quality bit generator 811 may generate a frame quality notification bit indicating the invalid frame FIG. 12 is a flowchart illustrating a procedure of detecting a frame in a mobile communication system according to a second embodiment of the present invention. Hereinafter, the procedure of detecting the frame according to the second embodiment of the present invention will be described in detail with reference to FIGS. 11 and 12.

The frame quality bit generator 811 checks the CRC bits from an output of the decoder at step 900. The CRC inspection may be performed through the depuncturing unit 801 and the CRC inspector 240. That is, the CRC inspector 240 performs the CRC test and outputs the result thereof. After that, the frame quality bit generator 811 determines if the CRC is good or valid at step 902. If it is determined at step 902 that the CRC is good, step 904 is performed. Otherwise, it is determined that the output of the decoder is invalid at step 912.

In step 904, the frame quality bit generator 811 calculates an accumulated value of required sections of a data part or a pseudo power control bit part during a TDM frame interval. That is, the accumulated value of the required sections is calculated by means of the first and second absolute value calculators 802 and 803 and first to third accumulators 804 to 806. In practice, the output of the CRC inspector 240 and the output of the comparator 808 are simultaneously generated if the first and second absolute value calculators 802 and 803 and first to third accumulators 804 to 806 are provided in hardware. However, the flowchart shown in FIG. 12 illustrates the output of the comparator after the CRC inspection step for illustrative purpose only.

The required sections may vary depending on Equations 7 to 13. After that, the calculated values are input into the metric generator 807. As the calculated values are input into the metric generator 807, the metric generator 807 calculates the metric through one of Equation 7 to 13 by using accumulated values and the comparator 808 compares the metric value with the predetermined threshold value at step 906. If the comparison result shows the valid state of the frame, the comparator 808 generates a signal indicating the validity of the frame. Otherwise, the comparator 808 generates a signal indicating invalidity of the frame.

After that, the frame quality bit generator 811 determines whether the comparison result shows the valid state of the frame at step 908. That is, the frame quality bit generator 811 checks whether the signal indicating the validity of the frame is input thereto from the comparator 808. If it is determined in step 808 that the frame is valid, the frame quality bit generator 811 outputs a frame quality bit indicating the valid state of the frame at step 910. Otherwise, the frame quality bit generator 811 outputs a frame quality bit indicating the invalid state of the frame at step 912.

Therefore, this embodiment of the present invention can precisely determine the valid state and the invalid state of the TDM frame transmitted through the F-DCCH by performing the above procedure. Hereinafter, this embodiment of the present invention will be described in relation to simulation results.

Figure 13:
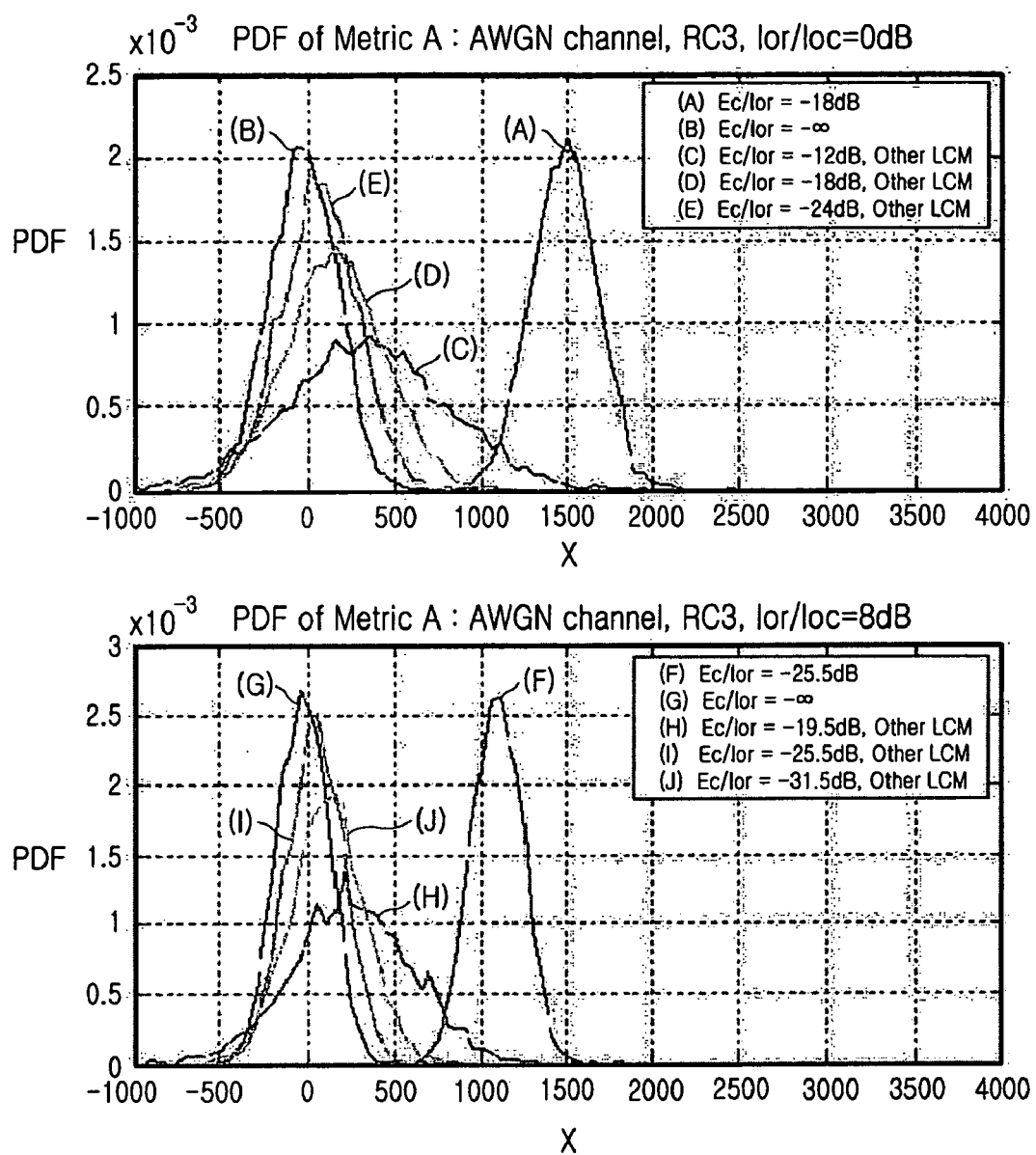
FIG. 13 are graphs illustrating performance test results obtained based on Equation 7 of the present invention according to an embodiment of the present invention.

FIG. 13 are graphs illustrating performance test results obtained based on Equation 7 of the present invention.

FIG. 13 shows a probability density function (PDF) in various environments when the metric is obtained based on Equation 7. The PDF is tested under the conditions that the control signal is transmitted to the mobile station, the control signal is not transmitted to the mobile station and the control signal is transmitted into other mobile stations. In addition, several tests are performed while varying to power when the control signal is transmitted to other mobile stations. Specifically, in a case that the control signal is transmitted to the mobile station, an Ec/Ior value satisfying a frame error rate (FER) of 1% is applied. In addition, in a case that the control signal is transmitted to other mobile stations, the PDF test is performed while varying the Ec/Ior value (for example, −12 dB, −18 dB and −24 dB). In addition, the PDF test is performed while varying a location value of the mobile station (for example, 0 dB and −8 dB) in order to display PDF variations according to the location of the mobile station in the cell.

Referring to FIG. 13, if the control signal is transmitted to the mobile station, the frame has curves (A) and (F). In addition, if the control signal is not transmitted to the mobile station, the frame has curves (B) and (G). If the control signal is transmitted to the other mobile station, the frame has curves (C), (D), (E), (H), (I) and (J). The graph shown in FIG. 13 is obtained based on Equation 7. That is, the graph shown in FIG. 13 is obtained by using the accumulated value for the PCB part in the frame. It can be understood from FIG. 13 that the PDF can be differentiated in most cases. However, the wrong TDM detection may occur if the frame transmitted to the other mobile station has a large amount of power. In addition, various threshold values must be applied according to the location of the mobile station in the cell.

Figure 14:
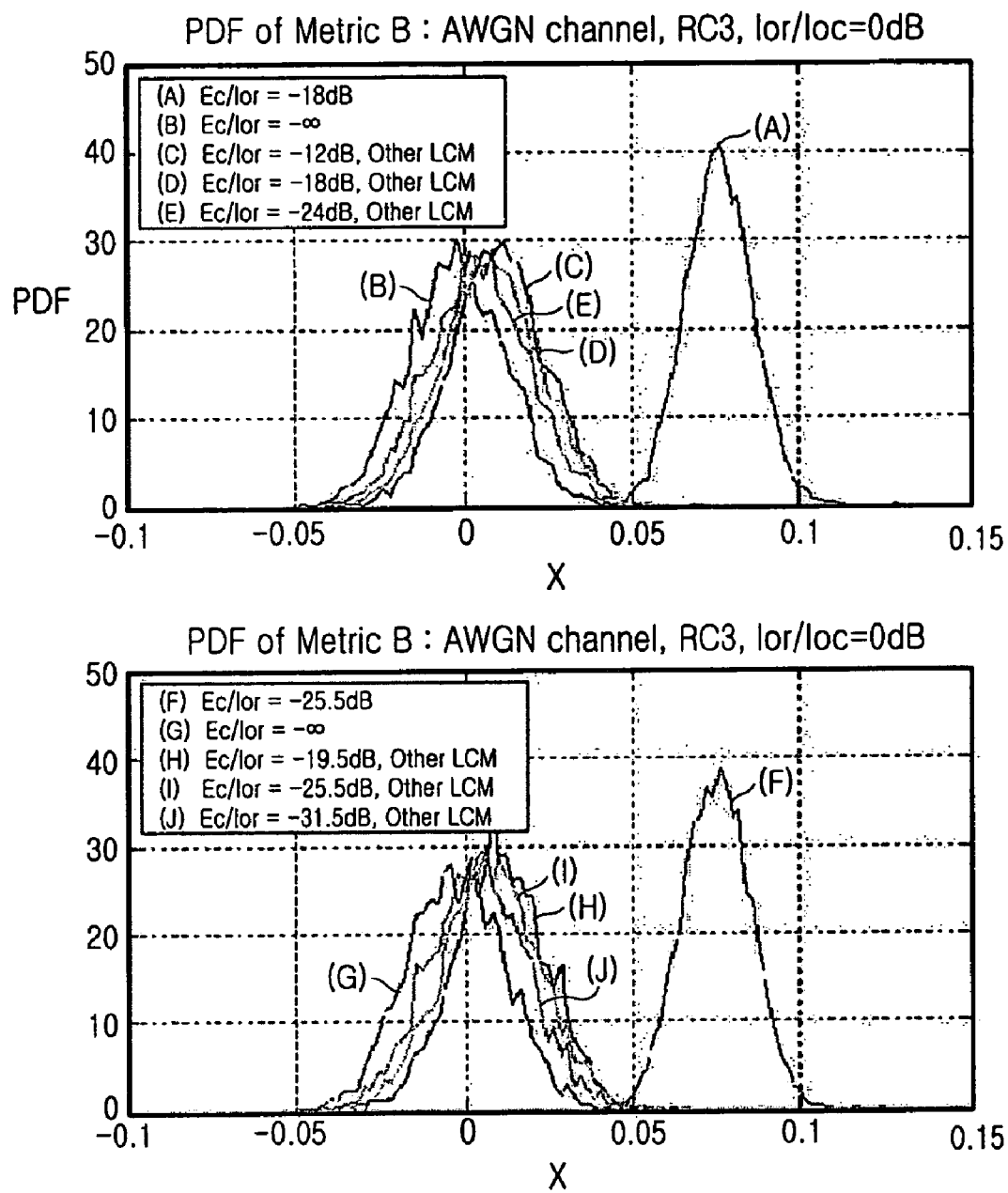
FIG. 14 are graphs illustrating performance test results obtained based on Equation 8 of the present invention according to an embodiment of the present invention.

FIG. 14 are graphs graph illustrating performance test results obtained based on Equation 8 of the present invention.

FIG. 14 shows the PDF in various environments when the metric is obtained based on Equation 8. The performance test has been conducted under the same conditions of FIG. 13.

Referring to FIG. 14, if the control signal is transmitted to the mobile station, the frame has curves (A) and (F). In addition, if the control signal is not transmitted to the mobile station, the frame has curves (B) and (G). If the control signal is transmitted to the other mobile station, the frame has curves (C), (D), (E), (H), (I) and (J). The graph shown in FIG. 14 is obtained based on Equation 8. That is, the graph shown in FIG. 14 is obtained by dividing the value of Equation 7 by the accumulated value of the data part in one frame. It can be understood from FIG. 14 that the PDF can be differentiated in most cases. That is, if the accumulated value of the pseudo power control bit part is large, the accumulated value of the data part is also large. Accordingly, if the metric is obtained based on the ratio of the accumulated value of the data part to the value of Equation 7, the frame having the control signal transmitted to other mobile station may have curves substantially identical to those of the frame having no control signal. In addition, it is possible to use a fixed threshold value regardless of the location of the mobile station in the cell.

Figure 15:
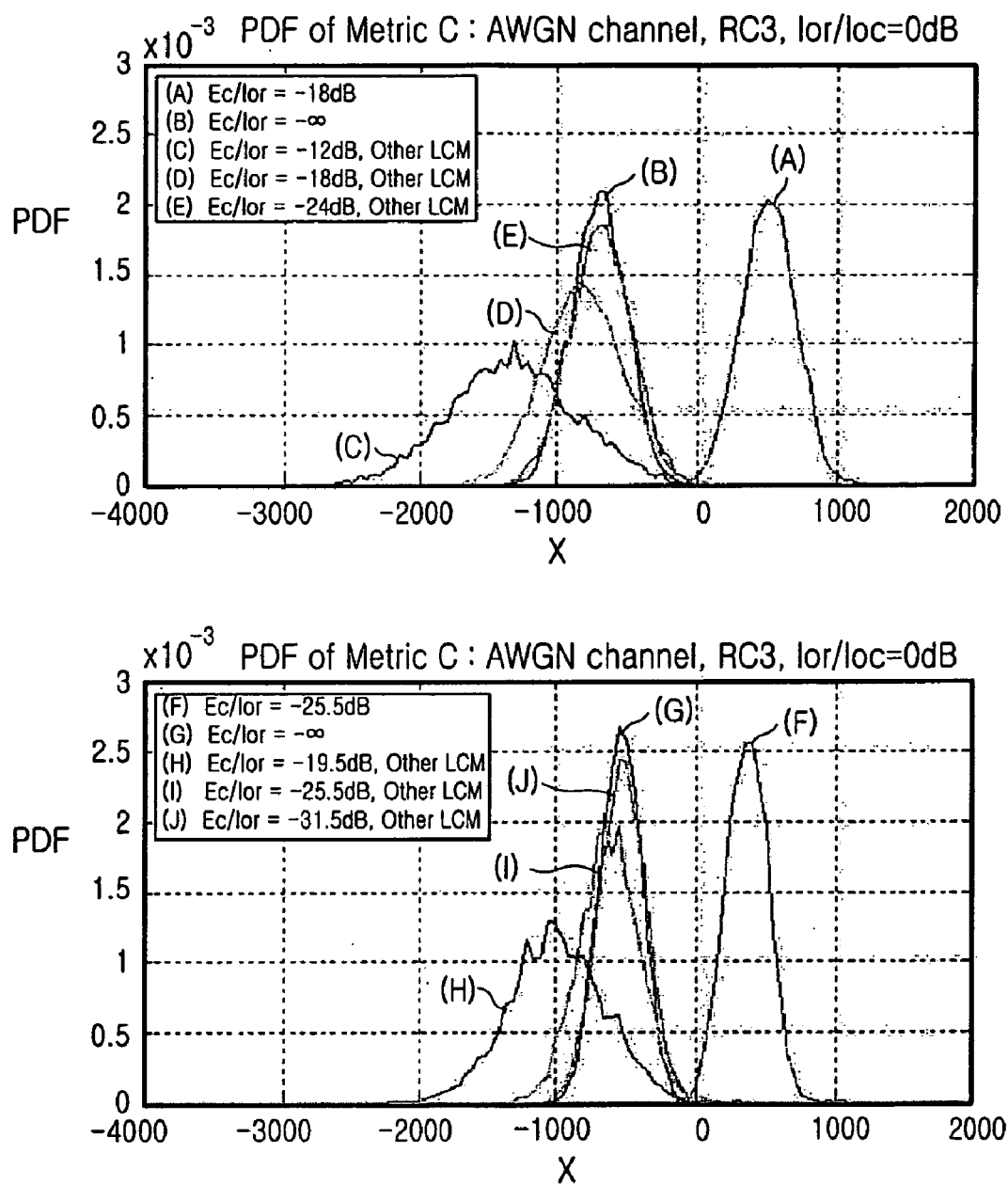
FIG. 15 are graphs illustrating performance test results obtained based on Equation 9 of the present invention according to an embodiment of the present invention.

FIG. 15 are graphs illustrating performance test results obtained based on Equation 9 of the present invention.

FIG. 15 shows the PDF in various environments when the metric is obtained based on Equation 9. The performance test has been conducted under the same conditions of FIGS. 13 and 14.

Referring to FIG. 15, if the control signal is transmitted to the mobile station, the frame has curves (A) and (F). In addition, if the control signal is not transmitted to the mobile station, the frame has curves (B) and (G). If the control signal is transmitted to the other mobile station, the frame has curves (C), (D), (E), (H), (I) and (J). The graph shown in FIG. 15 is obtained based on Equation 9. That is, the graph shown in FIG. 15 is obtained by subtracting the accumulated value of the data part in one frame from the value of Equation 7 after scaling the accumulated value of the data part. Herein, the term scaling refers to the accumulated value of the data part being multiplied by a constant obtained through various tests. The scaling constant used in FIG. 15 is 0.005.

It can be understood from FIG. 15 that the PDF can be differentiated in most cases. That is, if the accumulated value of the pseudo power control bit part is large, the accumulated value of the data part is also large. Accordingly, if the metric is obtained based on the differential value between the accumulated value of the data part and the value of Equation 7, the frame having the control signal transmitted to other mobile station may be easily distinguished as compared with the frame having no control signal. In addition, it is possible to use a fixed threshold value regardless of the location of the mobile station in the cell.

Although performance test results according to Equations 10 to 13 are not illustrated in figures, they are similar to the performance results shown in FIGS. 14 and 15 because Equations 10 to 14 represent the metrics similar to those of Equations 7 to 9.

As described above, according to embodiments of the present invention, the mobile station can precisely determine the valid and invalid states of the frame when the TDM channel is transmitted thereto through the F-DCCH in the mobile communication system. Accordingly, when it is necessary to receive services for a long period of time, such as broadcast services, the quality of services can be improved. In addition, the cell throughput of the base station can be improved.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for detecting a time division multiplexing (TDM) frame transmitted though a forward control channel, the method comprising the steps of:
   receiving the frame through the forward control channel and performing a cyclic redundancy checking (CRC) with respect to the frame, thereby outputting a first error detection bit;
   measuring a reception power for the frame;
   calculating a first path metric when decoding a channel of the frame, estimating a second path metric by using the first path metric and the reception power, and outputting a second error detection bit by comparing the second path metric with a predetermined threshold value; and
   creating and outputting a frame quality bit for detecting a validity of the frame based on the first and second error detection bits.

2. The method as claimed in claim 1, wherein the second path metric is estimated by using a differential value between the first path metric and the reception power.

3. The method as claimed in claim 1, wherein the second path metric is estimated by using a proportion between the first path metric and the reception power.

4. The method as claimed in claim 1, wherein the first and second path metrics are estimated based on a maximum correlation value.

5. The method as claimed in claim 4, wherein, if the second path metric is larger than the predetermined threshold value, the second error detection bit indicates that the frame is a valid frame.

6. The method as claimed in claim 1, wherein the first and second path metrics are estimated based on a minimum Euclidean distance.

7. The method as claimed in claim 6, wherein, if the second path metric is smaller than the predetermined threshold value, the second error detection bit indicates that the frame is a valid frame.

8. The method as claimed in claim 1, wherein the second path metric is defined according to a following equation:

$$FQM[k] = \frac{PM[k]}{PE[k]}$$

wherein, PM[k] is the first path metric, PE[k] is the reception power, and FQM[k] is the second path metric.

9. The method as claimed in claim 1, wherein the second path metric is defined according to a following equation:

$$FQM[k]=PM[k]-\alpha PE[k]$$

wherein, PM[k] is the first path metric, PE[k] is the reception power, $\alpha$ is a weight constant obtained through tests, and FQM[k] is the second path metric.

10. The method as claimed in claim 1, wherein, when at least one of the first and second error detection bits indicates an error of the frame, the frame quality bit represents the error of the frame.

11. An apparatus for detecting a time division multiplexing (TDM) frame transmitted through a forward control channel, the apparatus comprising:

a channel decoder for receiving the frame in order to decode a channel of the frame and to calculate and output a first path metric when decoding the channel of the frame;
a cyclic redundancy checking (CRC) inspector for outputting a first error detection bit by performing a CRC inspection with respect to decoded bits output from the channel decoder;
a reception power measurement unit for measuring reception power for the frame; and
a frame quality bit generating unit for estimating a second path metric by using the first path metric and the reception power, outputting a second error detection bit by comparing the second path metric with a predetermined threshold value, and creating and outputting a frame quality bit for detecting a validity of the frame based on the first and second error detection bits.

12. The apparatus as claimed in claim 11, wherein, when at least one of the first and second error detection bits indicates an error of the frame, the frame quality bit generating unit generates the frame quality bit indicating the error of the frame.

13. The apparatus as claimed in claim 11, wherein the second path metric is estimated by using a differential value between the first path metric and the reception power.

14. The apparatus as claimed in claim 11, wherein the second path metric is estimated by using a proportion between the first path metric and the reception power.

15. The apparatus as claimed in claim 11, wherein the frame quality bit generating unit comprises a path metric estimator for estimating the second path metric, a comparator for comparing the second path metric with the predetermined threshold value in order to create and output the second error detection bit, and a frame quality bit generator for creating and outputting the frame quality bit for detecting the validity of the frame based on the first and second error detection bits.

16. An apparatus for detecting a time division multiplexing (TDM) frame transmitted through a forward control channel, the apparatus comprising:
   a depuncturing unit for depuncturing control channel information by using a long code mask value allocated thereto in order to separately output data and a power control bit;
   a channel decoder for performing channel-decoding, and cyclic redundancy checking (CRC) inspection with respect to the data in order to output decoded data;
   a metric calculator for calculating a metric by using the data and power control bit;
   a comparator for comparing an output of the metric calculator with a predetermined threshold value and outputting a result thereof; and
   a frame quality bit generator for generating frame quality bits based on an output of the comparator and a result of the CRC inspection.

17. The apparatus as claimed in claim 16, wherein the power control bit is a pseudo power control bit inserted as a dummy bit if the forward control channel is allocated to a plurality of users.

18. The apparatus as claimed in claim 16, wherein the metric calculator comprises a first accumulator for calculating an accumulated absolute value of the data during a predetermined interval, a second accumulator for calculating an accumulated value of the power control bit during a predetermined interval, a third accumulator for calculating an accumulated absolute value of the power control bit during a predetermined interval, and a metric generator for creating the metric by using at least two output values of the first to third accumulators.

19. The apparatus as claimed in claim 16, wherein the metric is calculated by means of the metric calculator according to a following equation:

$$\text{Metric} = \sum_{n \in PCB} r[n]$$

wherein, n=1, 2, . . . N, wherein N is a number of symbols in a frame interval of the TDM frame, r[n] is a value of $n^{th}$ symbol in the frame interval received by the depuncturing unit, and PCB is a set of indexes in the frame interval corresponding to the power control bit.

20. The apparatus as claimed in claim 16, wherein the metric is calculated by means of the metric calculator according to a following equation:

$$\text{Metric} = \frac{\left(\sum_{n \in PCB} r[n]\right)}{\left(\sum_{n \notin PCB} |r[n]|\right)}$$

wherein, n=1, 2, . . . N, wherein N is a number of symbols in a frame interval of the TDM frame, PCB is a set of indexes in the frame interval corresponding to the power control bit, and r[n] is a value of $n^{th}$ symbol in the frame interval received by the depuncturing unit.

21. The apparatus as claimed in claim 16, wherein the metric is calculated by means of the metric calculator according to a following equation:

$$\text{Metric} = \left(\sum_{n \in PCB} r[n]\right) - \alpha \cdot \left(\sum_{n \notin PCB} |r[n]|\right)$$

wherein, n=1, 2, . . . N, wherein N is a number of symbols in a frame interval of the TDM frame, PCB is a set of indexes in the frame interval corresponding to the power control bit, r[n] is a value of $n^{th}$ symbol in the frame interval received by the depuncturing unit, and α is a constant obtained through various tests.

22. The apparatus as claimed in claim 16, wherein the metric is calculated by means of the metric calculator according to a following equation:

$$\text{Metric} = \frac{\left(\sum_{n \in PCB} r[n]\right)}{\left(\sum_{n \in PCB} |r[n]|\right)}$$

wherein, n=1, 2, . . . N, wherein N is a number of symbols in a frame interval of the TDM frame, PCB is a set of indexes in the frame interval corresponding to the power control bit, and r[n] is a value of $n^{th}$ symbol in the frame interval received by the depuncturing unit.

23. The apparatus as claimed in claim 16, wherein the metric is calculated by means of the metric calculator according to a following equation:

$$\text{Metric} = \left(\sum_{n \in PCB} r[n]\right) - \beta \cdot \left(\sum_{n \in PCB} |r[n]|\right)$$

wherein, n=1, 2, . . . N, wherein N is a number of symbols in a frame interval of the TDM frame, PCB is a set of indexes in the frame interval corresponding to the power control bit, r[n] is a value of $n^{th}$ symbol in the frame interval received by the depuncturing unit, and β is a constant obtained through various tests.

24. The apparatus as claimed in claim 16, wherein the metric is calculated by means of the metric calculator according to a following equation:

$$\text{Metric} = \frac{\left(\sum_{n \in PCB} r[n]\right)}{\left(\sum_{n \in Frame} |r[n]|\right)}$$

wherein, n=1, 2, . . . N, wherein N is a number of symbols in a frame interval of the TDM frame, PCB is a set of indexes in the frame interval corresponding to the power control bit, Frame is a set of indexes in the frame interval comprising the data and the power control bit, and r[n] is a value of $n^{th}$ symbol in the frame interval received by the depuncturing unit.

25. The apparatus as claimed in claim 16, wherein the metric is calculated by means of the metric calculator according to a following equation:

$$\text{Metric} = \left(\sum_{n \in PCB} r[n]\right) - \gamma \cdot \left(\sum_{n \in Frame} |r[n]|\right)$$

wherein, n=1, 2, . . . N, wherein N is a number of symbols in a frame interval of the TDM frame, PCB is a set of indexes in the frame interval corresponding to the power control bit, Frame is a set of indexes in the frame interval comprising the data and the power control bit, r[n] is a value of $n^{th}$ symbol in the frame interval received by the depuncturing unit, and γ is a constant obtained through various tests.

26. The apparatus as claimed in claim 16, wherein the metric is calculated by means of the metric calculator according to a following equation:

$$\text{Metric} = \left|\sum_{n \in PCB} r[n]\right|$$

wherein, n=1, 2, . . . N, wherein N is a number of symbols in a frame interval of the TDM frame, PCB is a set of indexes in the frame interval corresponding to the power control bit, and r[n] is a value of $n^{th}$ symbol in the frame interval received by the depuncturing unit.

27. The apparatus as claimed in claim 16, wherein the metric is calculated by means of the metric calculator according to a following equation:

$$\text{Metric} = \frac{\left|\sum_{n \in PCB} r[n]\right|}{\left[\sum_{n \notin PCB} r[n]\right]}$$

wherein, n=1, 2, ... N, wherein N is a number of symbols in a frame interval of the TDM frame, PCB is a set of indexes in the frame interval corresponding to the power control bit, and r[n] is a value of $n^{th}$ symbol in the frame interval received by the depuncturing unit.

28. The apparatus as claimed in claim 16, wherein the metric is calculated by means of the metric calculator according to a following equation:

$$\text{Metric} = \left|\sum_{n \in PCB} r[n]\right| - \alpha \cdot \left[\sum_{n \notin PCB} r[n]\right]$$

wherein, n=1, 2, ... N, wherein N is a number of symbols in a frame interval of the TDM frame, PCB is a set of indexes in the frame interval corresponding to the power control bit, r[n] is a value of $n^{th}$ symbol in the frame interval received by the depuncturing unit, and α is a constant obtained through various tests.

29. The apparatus as claimed in claim 16, wherein the metric is calculated by means of the metric calculator according to a following equation:

$$\text{Metric} = \frac{\left|\sum_{n \in PCB} r[n]\right|}{\left[\sum_{n \in PCB} r[n]\right]}$$

wherein, n=1, 2, ... N, wherein N is a number of symbols in a frame interval of the TDM frame, PCB is a set of indexes in the frame interval corresponding to the power control bit, and r[n] is a value of $n^{th}$ symbol in the frame interval received by the depuncturing unit.

30. The apparatus as claimed in claim 16, wherein the metric is calculated by means of the metric calculator according to a following equation:

$$\text{Metric} = \left|\sum_{n \in PCB} r[n]\right| - \beta \cdot \left[\sum_{n \in PCB} |r[n]|\right]$$

wherein, n=1, 2, ... N, wherein N is a number of symbols in a frame interval of the TDM frame, PCB is a set of indexes in the frame interval corresponding to the power control bit, r[n] is a value of $n^{th}$ symbol in the frame interval received by the depuncturing unit, and β is a constant obtained through various tests.

31. The apparatus as claimed in claim 16, wherein the metric is calculated by means of the metric calculator according to a following equation:

$$\text{Metric} = \frac{\left|\sum_{n \in PCB} r[n]\right|}{\left[\sum_{n \in Frame} |r[n]|\right]}$$

wherein, n=1, 2, ... N, wherein N is a number of symbols in a frame interval of the TDM frame, PCB is a set of indexes in the frame interval corresponding to the power control bit, Frame is a set of indexes in the frame interval comprising the data and the power control bit, and r[n] is a value of $n^{th}$ symbol in the frame interval received by the depuncturing unit.

32. The apparatus as claimed in claim 16, wherein the metric is calculated by means of the metric calculator according to a following equation:

$$\text{Metric} = \left|\sum_{n \in PCB} r[n]\right| - \gamma \cdot \left[\sum_{n \in Frame} |r[n]|\right]$$

wherein, n=1, 2, ... N, wherein N is a number of symbols in a frame interval of the TDM frame, PCB is a set of indexes in the frame interval corresponding to the power control bit, Frame is a set of indexes in the frame interval comprising the data and the power control bit, r[n] is a value of $n^{th}$ symbol in the frame interval received by the depuncturing unit, and γ is a constant obtained through various tests.

33. A method for detecting a time division multiplexing (TDM) frame transmitted through a forward control channel, the method comprising the steps of:
depuncturing control channel information by using an allocated long code mask value, thereby separately outputting data and a power control bit;
performing channel-decoding and cyclic redundancy checking (CRC) inspection with respect to the data, thereby outputting decoded data;
calculating a metric by using the data and power control bit; and
comparing the calculated metric with a predetermined threshold value and generating frame quality bits based on results of comparison and the CRC inspection.

34. The method as claimed in claim 33, wherein the power control bit is a pseudo power control bit inserted as a dummy bit if the forward control channel is allocated to a plurality of users.

* * * * *